United States Patent
Hatakeyama et al.

(10) Patent No.: US 9,007,482 B2
(45) Date of Patent: Apr. 14, 2015

(54) IMAGE PROCESSING METHOD, IMAGE PROCESSING APPARATUS, IMAGE PICKUP APPARATUS, AND NON-TRANSITORY COMPUTER-READABLE STORAGE MEDIUM

(75) Inventors: Koshi Hatakeyama, Tokyo (JP); Takeshi Watanabe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 254 days.

(21) Appl. No.: 13/568,497

(22) Filed: Aug. 7, 2012

(65) Prior Publication Data
US 2013/0038749 A1    Feb. 14, 2013

(30) Foreign Application Priority Data
Aug. 8, 2011    (JP) ................. 2011-172503

(51) Int. Cl.
 *H04N 5/228* (2006.01)
 *G06K 9/40* (2006.01)
 *G06T 5/00* (2006.01)

(52) U.S. Cl.
 CPC ....... *G06T 5/003* (2013.01); *G06T 2207/20182* (2013.01)

(58) Field of Classification Search
None
See application file for complete search history.

(56) References Cited

U.S. PATENT DOCUMENTS

| | | | |
|---|---|---|---|
| 6,697,522 B1 | 2/2004 | Ishikawa | |
| 7,228,005 B1 * | 6/2007 | Yuan | 382/280 |
| 7,627,193 B2 | 12/2009 | Alon et al. | |
| 8,300,121 B2 | 10/2012 | Yahata | |
| 2004/0150732 A1 | 8/2004 | Yamanaka | |
| 2006/0239549 A1 | 10/2006 | Kelly et al. | |
| 2007/0002158 A1 * | 1/2007 | Robinson | 348/335 |
| 2007/0116375 A1 | 5/2007 | Utsugi et al. | |
| 2007/0126892 A1 | 6/2007 | Guan | |
| 2007/0146689 A1 | 6/2007 | Araki et al. | |
| 2007/0279618 A1 | 12/2007 | Sano et al. | |
| 2008/0007797 A1 | 1/2008 | Hayashi et al. | |
| 2008/0043126 A1 | 2/2008 | Hayashi | |
| 2008/0074507 A1 * | 3/2008 | Ohara et al. | 348/222.1 |

(Continued)

FOREIGN PATENT DOCUMENTS

| | | |
|---|---|---|
| CN | 101080742 A | 11/2007 |
| JP | 2002-199203 A | 7/2002 |

(Continued)

OTHER PUBLICATIONS

Extended European Search Report for corresponding EP 12179464.8, dated Sep. 18, 2013.

(Continued)

*Primary Examiner* — Justin P Misleh
(74) *Attorney, Agent, or Firm* — Rossi, Kimms & McDowell LLP

(57) ABSTRACT

An image processing method of performing an image restoration processing of an image, includes the steps of generating a plurality of first optical transfer functions depending on a position of the image using coefficient data depending on an image pickup condition of the image, generating a plurality of second optical transfer functions by rotating the first optical transfer functions around a center of the image or around an optical axis of an image pickup optical system, generating an image restoration filter based on the first optical transfer functions and the second optical transfer functions, and performing the image restoration processing of the image using the image restoration filter.

21 Claims, 14 Drawing Sheets

(56) References Cited

U.S. PATENT DOCUMENTS

| | | |
|---|---|---|
| 2008/0080019 A1 | 4/2008 | Hayashi et al. |
| 2008/0095358 A1* | 4/2008 | Eguchi et al. .................. 380/28 |
| 2009/0059167 A1* | 3/2009 | Wooley et al. ................ 351/161 |
| 2009/0195672 A1* | 8/2009 | Ono ........................... 348/231.3 |
| 2009/0201386 A1* | 8/2009 | Ono ........................... 348/222.1 |
| 2009/0245688 A1* | 10/2009 | Robinson et al. ............. 382/284 |
| 2009/0252430 A1* | 10/2009 | Hou et al. ..................... 382/254 |
| 2009/0322928 A1 | 12/2009 | Robinson et al. |
| 2010/0079626 A1 | 4/2010 | Hatakeyama |
| 2010/0079627 A1* | 4/2010 | Ono ............................. 348/241 |
| 2011/0135216 A1 | 6/2011 | Hatakeyama |
| 2012/0075502 A1* | 3/2012 | Watanabe ............... 348/231.99 |

FOREIGN PATENT DOCUMENTS

| | | |
|---|---|---|
| JP | 2004-241991 A | 8/2004 |
| JP | 2005-063323 A | 3/2005 |
| JP | 2010-056992 A | 3/2010 |
| JP | 2010-087672 A | 4/2010 |
| JP | 2011-010214 A | 1/2011 |

OTHER PUBLICATIONS

JP OA issued Jul. 23, 2013 for corres. JP 2011-172503.
Chinese Office Action cited in Chinese counterpart application No. CN201210274125.4, dated Aug. 5, 2014. English translation provided.

* cited by examiner

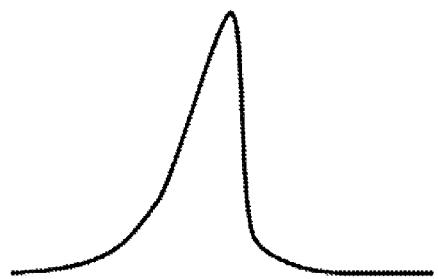
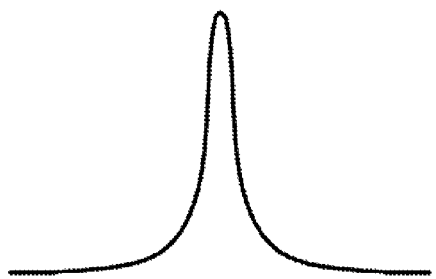
FIG. 4A  FIG. 4B
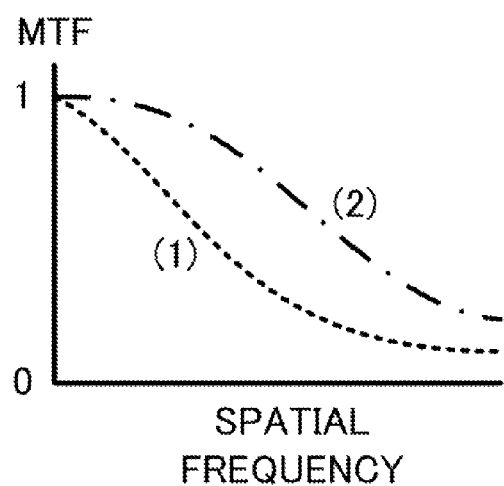
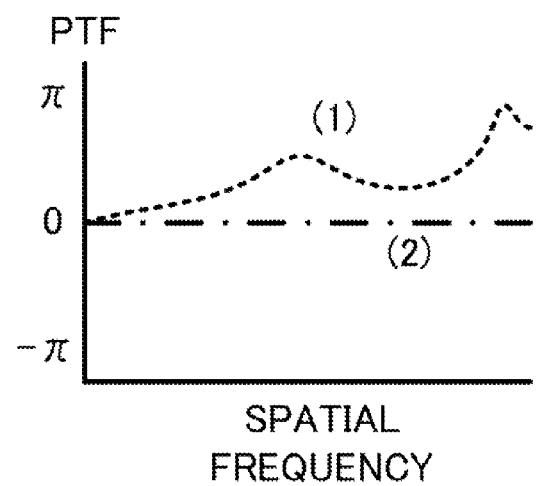
FIG. 5A  FIG. 5B

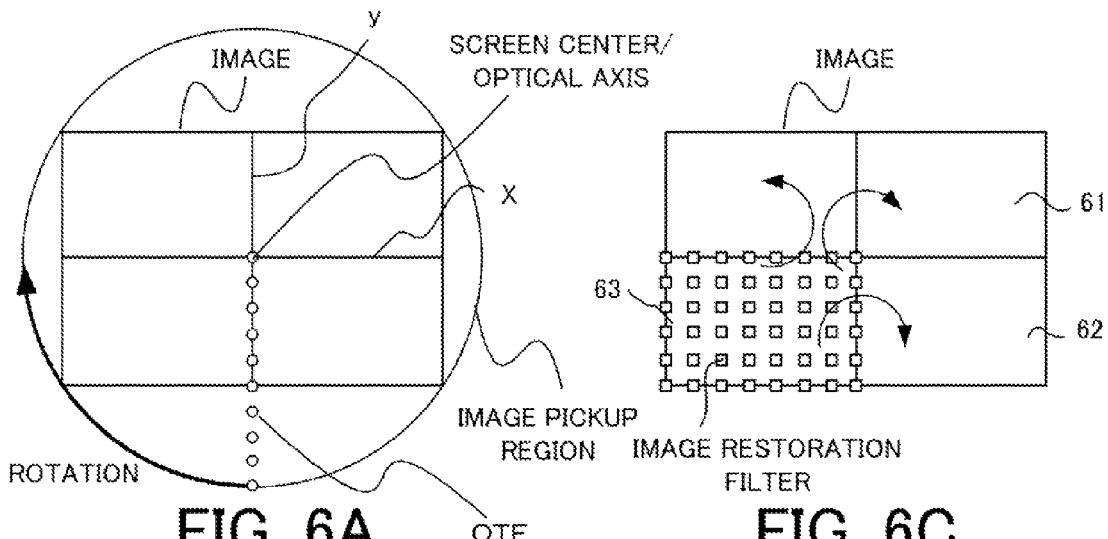
FIG. 6A
FIG. 6C
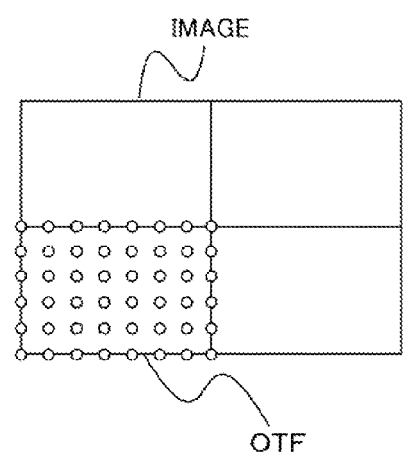
FIG. 6B
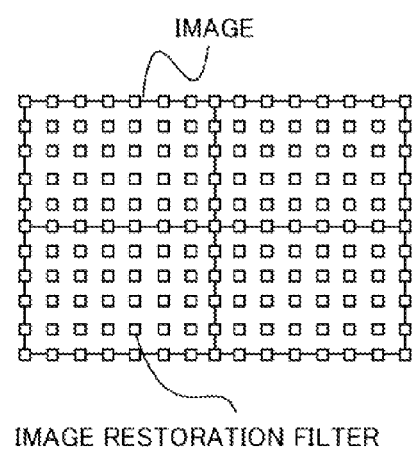
FIG. 6D
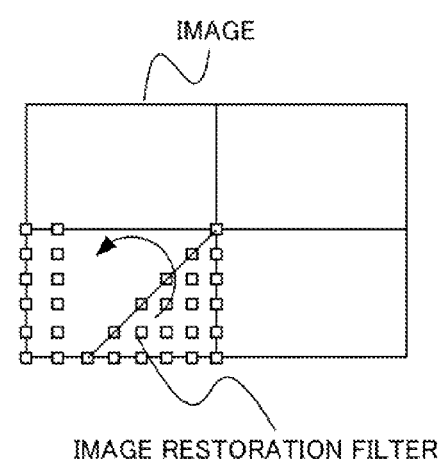
FIG. 6E

LENS ID : NO.123
APERTURE : F2.8
ZOOM : WIDE
OBJECT DISTANCE : CLOSE

REAL PART COEFFICIENT

IMAGE HEIGHT 1
COEFFICIENT
$c\_r1[0][0]$
$c\_r1[0][1]$
$c\_r1[0][2]$
$c\_r1[0][3]$
.
.
.
$c\_r1[10][8]$
$c\_r1[10][9]$
$c\_r1[10][10]$

TAP NUMBER
M1

IMAGE HEIGHT 2
COEFFICIENT
$c\_r2[0][0]$
$c\_r2[0][1]$
$c\_r2[0][2]$
$c\_r2[0][3]$
.
.
.
$c\_r2[10][8]$
$c\_r2[10][9]$
$c\_r2[10][10]$

TAP NUMBER
M2

IMAGE HEIGHT 3
COEFFICIENT
$c\_r3[0][0]$
$c\_r3[0][1]$
$c\_r3[0][2]$
$c\_r3[0][3]$
.
.
.
$c\_r3[10][8]$
$c\_r3[10][9]$
$c\_r3[10][10]$

TAP NUMBER
M3

IMAGE HEIGHT 10
COEFFICIENT
$c\_r10[0][0]$
$c\_r10[0][1]$
$c\_r10[0][2]$
$c\_r10[0][3]$
.
.
.
$c\_r1[10][8]$
$c\_r1[10][9]$
$c\_r1[10][10]$

TAP NUMBER
M10

IMAGINARY PART COEFFICIENT

COEFFICIENT
$c\_i1[0][0]$
$c\_i1[0][1]$
$c\_i1[0][2]$
$c\_i1[0][3]$
.
.
.
$c\_i1[10][8]$
$c\_i1[10][9]$
$c\_i1[10][10]$

TAP NUMBER
M1

COEFFICIENT
$c\_i2[0][0]$
$c\_i2[0][1]$
$c\_i2[0][2]$
$c\_i2[0][3]$
.
.
.
$c\_i2[10][8]$
$c\_i2[10][9]$
$c\_i2[10][10]$

TAP NUMBER
M2

COEFFICIENT
$c\_i3[0][0]$
$c\_i3[0][1]$
$c\_i3[0][2]$
$c\_i3[0][3]$
.
.
.
$c\_i3[10][8]$
$c\_i3[10][9]$
$c\_i3[10][10]$

TAP NUMBER
M3

COEFFICIENT
$c\_i10[0][0]$
$c\_i10[0][1]$
$c\_i10[0][2]$
$c\_i10[0][3]$
.
.
.
$c\_i10[10][8]$
$c\_i10[10][9]$
$c\_i10[10][10]$

TAP NUMBER
M10

FIG. 9

IMAGE PROCESSING METHOD, IMAGE PROCESSING APPARATUS, IMAGE PICKUP APPARATUS, AND NON-TRANSITORY COMPUTER-READABLE STORAGE MEDIUM

BACKGROUND OF THE INVENTION

1. Field of the Invention

The present invention relates to an image processing method that performs an image restoration processing of an image.

2. Description of the Related Art

An image (a taken image) that is obtained by an image pickup apparatus contains a blur component of an image caused by each aberration such as spherical aberration, coma aberration, distortion, or astigmatism of an image pickup optical system, and therefore it is deteriorated. The blur component of the image caused by such aberrations means that a light beam emitted from one point of an object is actually spread although it should be ideally collected on one point on an imaging plane again when any aberration does not exist and also any influence by diffractions does not exist, which is represented by point spread function (PSF).

The optical transfer function (OTF) that is obtained by performing the Fourier transform is frequency component information of the aberration, and it is represented by a complex number. An absolute value of the optical transfer function OTF, i.e. amplitude component is referred to as an MTF (Modulation Transfer Function), and a phase component is referred to as a PTF (Phase Transfer Function). The amplitude component MTF and the phase component PTF are frequency characteristics of an amplitude component and a phase component of the image deterioration caused by the aberration, respectively, and the phase component is represented as a phase angle by the following expression.

$$PTF = tan^{-1}(Im(OTF)/Re(OTF))$$

In the expression, Re(OTF) and Im(OTF) indicate a real part and an imaginary part of the optical transfer function OTF, respectively. Thus, the optical transfer function OTF of the image pickup optical system deteriorates the amplitude component MTF and the phase component PTF of the image, and therefore the deteriorated image is in a state where each point of the object is asymmetrically blurred as it has the coma aberration. Chromatic aberration of magnification is generated because an imaging position is shifted by the difference of an imaging magnification for each light wavelength and it is obtained as color components of for example RGB in accordance with the spectroscopic characteristics of an image pickup apparatus. Accordingly, the imaging positions are shifted between the RGB, and therefore the shift of the imaging position for a wavelength, i.e. the spread of the image caused by the phase shift is also generated in each color component.

As a method of correcting the deteriorations of the amplitude component MTF and the phase component PTF, a method of performing the correction using information of the optical transfer function OTF of the image pickup optical system is known. This method is called an image restoration or an image recovery, and hereinafter, a processing of correcting the deterioration of the image using the information of the optical transfer function (OTF) of the image pickup optical system is referred to as an image restoration processing. As described below in detail, as one of methods of the image restoration, a method of convoluting an image restoration filter that has inverse characteristics of the optical transfer function (OTF) with an input image is known.

In order to effectively use the image restoration, it is necessary to obtain more precise OTF information of the image pickup optical system. A general OTF of the image pickup optical system significantly varies in accordance with an image height (a position of an image). Furthermore, the optical transfer function OTF is two-dimensional data, which contains a real part and an imaginary part since it is a complex number. In addition, when an image restoration processing is performed for a color image that has three color components of RGB, the OTF data for one image height is tap number in a vertical direction×tap number in a horizontal direction×2 (the real part and the imaginary part)×3 (RGB). The tap number means a size of the OTF data in the vertical and horizontal directions. If these are stored with respect to all image pickup conditions such as an image height, an F-number (an aperture), zoom (a focal length), an object distance, an amount of data is enormous.

Japanese Patent Laid-Open No. 2010-56992 discloses a technology that stores a filter coefficient for correcting the deterioration of the image to perform an image processing. However, since a restoration filter depending on a position in a screen is necessary, an amount of data is enormous. Japanese Patent Laid-Open No. 2004-241991 discloses a method of obtaining a distance from an optical center for correcting a chromatic aberration of magnification and substituting the distance in a cubic function to calculate a correction moving amount of R and B components to determine a correction amount depending on the position in the screen though it is not a technology of the image restoration.

However, since the image restoration filter is two-dimensional data, the image restoration filter depending on the position of the image is not determined only by the distance from the optical center (a center of the image or an optical axis of the image pickup optical system), and a rotation is necessary. Therefore, the method of Japanese Patent Laid-Open No. 2004-241991 cannot be applied to the image restoration processing. Furthermore, since the coefficient of the image restoration filter varies minutely between taps, a value of the filter coefficient is significantly collapsed and the effect of the image restoration processing is not obtained.

SUMMARY OF THE INVENTION

The present invention provides an image processing method, an image processing apparatus, an image pickup apparatus, and a non-transitory computer-readable storage medium that can perform an image restoration processing with high accuracy while reducing an amount of information required for the image restoration processing.

An image processing method as one aspect of the present invention performs an image restoration processing of an image, and the image processing method includes the steps of generating a plurality of first optical transfer functions depending on a position of the image, using coefficient data depending on an image pickup condition of the image, generating a plurality of second optical transfer functions by rotating the first optical transfer functions around a center of the image or around an optical axis of an image pickup optical system, generating an image restoration filter based on the first optical transfer functions and the second optical transfer functions, and performing the image restoration processing of the image using the image restoration filter.

An image processing method as another aspect of the present invention performs an image restoration processing of an image, and the image processing method includes the steps of generating a plurality of first optical transfer functions depending on a position of the image using coefficient data depending on an image pickup condition of the image, and generating an optical transfer function of at least one of a second region and a third region using an optical transfer function of a first region, where the first region and the second region are regions which are symmetric to each other with respect to the center of the image or the optical axis of an image pickup optical system and the third region is a region which is symmetric with respect to a straight line that passes through the first region and the center of the image in the image.

An image processing method as another aspect of the present invention performs an image restoration processing of an image, and the image processing method includes the steps of generating a plurality of first optical transfer functions depending on a position of the image using coefficient data depending on an image pickup condition of the image, generating a second optical transfer function that has a shape equivalent to an optical transfer function obtained by rotating the first optical transfer function around a center of the image or around an optical axis of an image pickup optical system using the first optical transfer function, generating an image restoration filter based on the first optical transfer function and the second transfer function, and performing the image restoration processing of the image using the image restoration filter.

An image processing apparatus as another aspect of the present invention performs an image restoration processing of an image, and the image processing apparatus includes a first optical transfer function generating portion configured to generate a plurality of first optical transfer functions depending on a position of the image using coefficient data depending on an image pickup condition of the image, a second optical transfer function generating portion configured to generate a plurality of second optical transfer functions by rotating the first optical transfer functions around a center of the image or around an optical axis of an image pickup optical system, an image restoration filter generating portion configured to generate an image restoration filter based on the first optical transfer functions and the second optical transfer functions, and an image restoration portion configured to perform the image restoration processing of the image using the image restoration filter.

An image pickup apparatus as another aspect of the present invention performs an image restoration processing of an image, and the image pickup apparatus includes a first optical transfer function generating portion configured to generate a plurality of first optical transfer functions depending on a position of the image using coefficient data depending on an image pickup condition of the image, a second optical transfer function generating portion configured to generate a plurality of second optical transfer functions by rotating the first optical transfer functions around a center of the image or around an optical axis of an image pickup optical system, an image restoration filter generating portion configured to generate an image restoration filter based on the first optical transfer functions and the second optical transfer functions, and an image restoration portion configured to perform the image restoration processing of the image using the image restoration filter.

A non-transitory computer-readable storage medium as another aspect of the present invention stores a process for causing an information processing apparatus to execute a method, and the method comprising the steps of generating a plurality of first optical transfer functions depending on a position of the image using coefficient data depending on an image pickup condition of the image, generating a plurality of second optical transfer functions by rotating the first optical transfer functions around a center of the image or around an optical axis of an image pickup optical system, generating an image restoration filter based on the first optical transfer functions and the second optical transfer functions, and performing the image restoration processing of the image using the image restoration filter.

Further features and aspects of the present invention will become apparent from the following description of exemplary embodiments with reference to the attached drawings.

BRIEF DESCRIPTION OF THE DRAWINGS

FIGS. 4A and 4B are diagrams of describing a point spread function PSF in the present embodiment.

FIGS. 5A and 5B are diagrams of describing an amplitude component MTF and a phase component PTF of an optical transfer function in the present embodiment, respectively.

FIGS. 6A to 6E are diagrams of illustrating a method of generating an image restoration filter in Embodiment 1.

FIG. 9 is a diagram of describing coefficient data in Embodiment 1.

DESCRIPTION OF THE PREFERRED EMBODIMENTS

Figure 1:
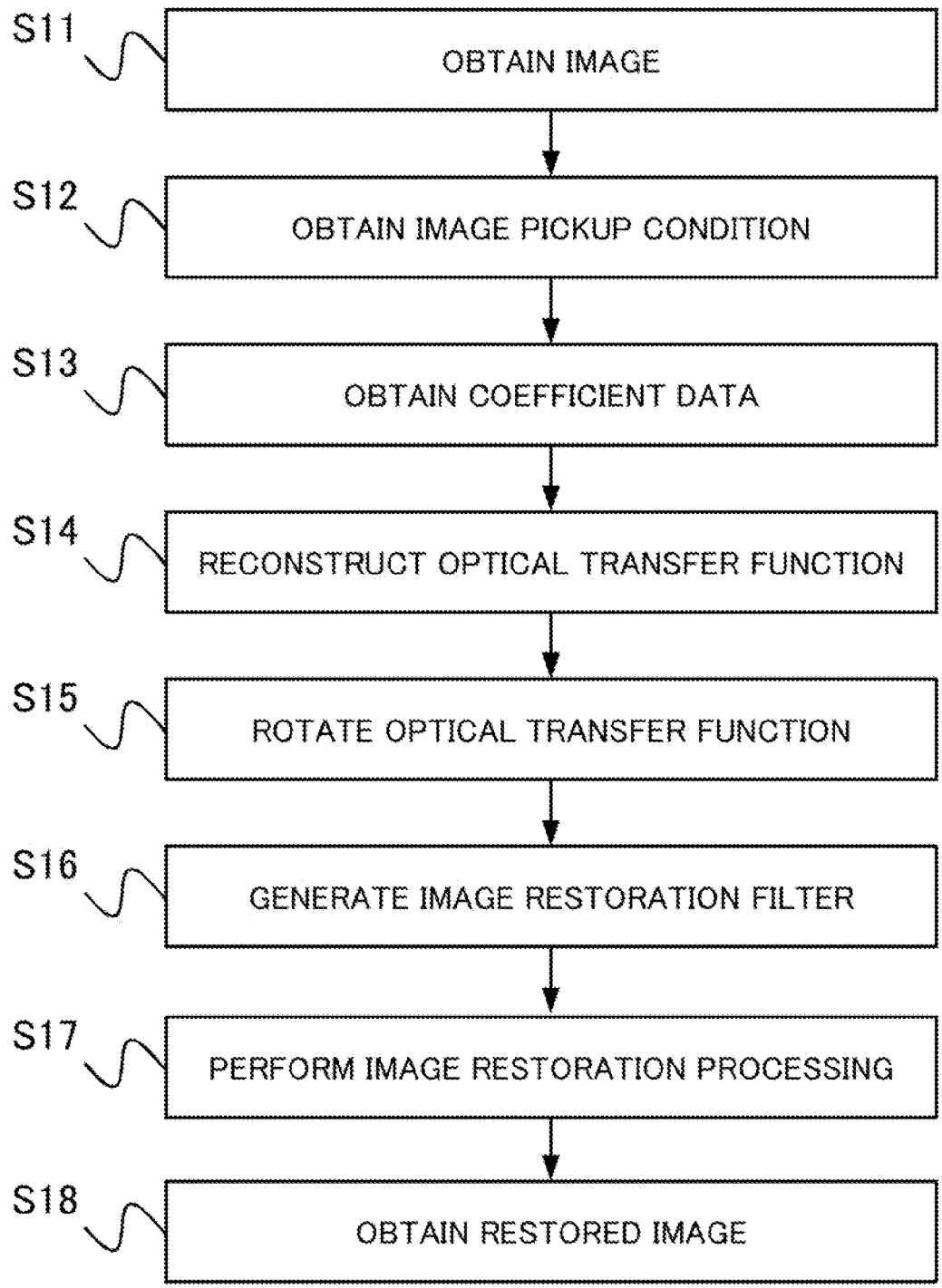
FIG. 1 is a flowchart of an image processing method in Embodiment 1.

Exemplary embodiments of the present invention will be described below with reference to the accompanied drawings. In each of the drawings, the same elements will be denoted by the same reference numerals and the duplicate descriptions thereof will be omitted.

First of all, definitions of terms that are described in the present embodiment and an image restoration processing (an image processing method) will be described. The image processing method described here is appropriately used in each of the following embodiments.

[Input Image]

An input image is a digital image (an image, or a taken image) that is obtained by receiving light on an image pickup element via an image pickup optical system, which is deteriorated in accordance with an optical transfer function OTF due to an aberration of the image pickup optical system that includes a lens and various kinds of optical filter. The image pickup optical system can also be configured by using a mirror (a reflection surface) that has a curvature, as well as a lens.

A color component of the input image, for example, has information of RGB color components. As a color component, in addition to that, a color space that is commonly used such as brightness, color phase, and chroma represented by LCH, luminance represented by YCbCr, or a color-difference signal can also be selectively used. As another color space, XYZ, Lab, Yuv, and JCh can also be used. Furthermore, a color temperature may also be used.

An image pickup condition such as a focal length of a lens, an aperture (F-number), or an object distance or various kinds of correction information to correct this image can be added to the input image or an output image. When the image is transferred from an image pickup apparatus to an image processing apparatus that is separated from the image pickup apparatus to perform a correction processing, it is preferred that the image pickup condition or the information related to the correction be added to the image as described above. As another method of transferring the image pickup condition or the information related to the correction, the image pickup apparatus and the image processing apparatus may also be directly or indirectly connected with each other to transfer it between them.

[Image Restoration Processing]

Subsequently, an outline of the image restoration processing will be described. When the image (the taken image, or the deteriorated image) is denoted by g(x, y), an original image is denoted by f(x, y), and a point spread function PSF that is a Fourier pair of the optical transfer function OTF is denoted by h(x, y), the following Expression (1) is met.

$$g(x,y)=h(x,y)*f(x,y) \qquad (1)$$

In Expression (1), symbol * denotes a convolution (a product sum), and symbol (x, y) denotes a coordinate on the image.

When the Fourier transform is performed for Expression (1) to be transformed to a display format on a frequency plane, Expression (2) that is represented as a product for each frequency is obtained.

$$G(u,v)=H(u,v) \cdot F(u,v) \qquad (2)$$

In Expression (2), symbol H denotes an optical transfer function OTF that is obtained by performing the Fourier transform for the point spread function PSF(h), and symbols G and F denote functions that are obtained by performing the Fourier transform for the deteriorated image g and the original image f, respectively. Symbol (u, v) denotes a coordinate on a two-dimensional frequency plane, i.e. a frequency.

In order to obtain the original image f from the image, i.e. the deteriorated image g, as represented by the following Expression (3), both sides may be divided by the optical transfer function h.

$$G(u,v)/H(u,v)=F(u,v) \qquad (3)$$

Then, the inverse Fourier transform is performed for F(u, v), i.e. G(u, v)/H(u, v), to be restored on a real plane to obtain the original image f(x, y) as a restored image.

When symbol R denotes a value that is obtained by performing the inverse Fourier transform for $H^{-1}$, the original image f(x, y) can be similarly obtained by the convolution processing for the image on the real plane as represented by the following Expression (4).

$$g(x,y)*R(x,y)=f(x,y) \qquad (4)$$

In Expression (4), symbol R(x, y) is called an image restoration filter. When the image is a two-dimensional image, commonly, the image restoration filter R is also a two-dimensional filter that has taps (cells) corresponding to each of pixels of the image. Generally, as the number of the taps (the number of the cells) of the image restoration filter R is large, the restoration accuracy is improved. Therefore, the number of the taps that can be realized is set in accordance with characteristics such as a required image quality, an image processing capability, or an aberration. Since the image restoration filter R at least needs to reflect the characteristics of the aberration, it is different from a conventional edge enhancement filter (a high-pass filter) that has around three taps horizontally and vertically. Since the image restoration filter R is set based on the optical transfer function OTF, both the deteriorations of an amplitude component and a phase component can be corrected with high accuracy.

Since a real image contains a noise component, the noise component is significantly amplified as the deteriorated image is restored when the image restoration filter R that is generated by using the complete inverse of the optical transfer function OTF is used. This is because MTF is held up so as to restore the MTF (the amplitude component) of the optical system to 1 over an entire frequency for a state where amplitude of the noise is added to the amplitude component of the image. Although the MTF that is amplitude deterioration caused by the optical system is restored to 1, at the same time, a power spectrum of the noise is also held up, and as a result, the noise is amplified in accordance with the degree (a restoration gain) to hold up the MTF.

Therefore, when the noise is contained, an appropriate image as an ornamental image cannot be obtained. This is represented by the following Expressions (5-1) and (5-2).

$$G(u,v)=H(u,v) \cdot F(u,v)+N(u,v) \qquad (5\text{-}1)$$

$$G(u,v)/H(u,v)=F(u,v)+N(u,v)/H(u,v) \qquad (5\text{-}2)$$

In Expressions (5-1) and (5-2), symbol N denotes a noise component.

With regard to the image that contains the noise component, for example as Wiener filter represented by the following Expression (6), there is a method of controlling the restoration degree in accordance with an intensity ratio SNR of an image signal and a noise signal.

$$M(u,v) = \frac{1}{H(u,v)} \frac{|H(u,v)|^2}{|H(u,v)|^2+SNR^2} \qquad (6)$$

In Expression (6), symbol M(u, v) is frequency characteristics of the Wiener filter, and symbol |H(u, v)| is an absolute value (MTF) of the optical transfer function OTF. In this method, for each frequency, the restoration gain (the restoration degree) is reduced as the MTF is small, and the restoration gain is increased as the MTF is large. Commonly, since the MTF of the image pickup optical system is high at a low frequency side and is low at a high frequency side, this method substantially reduces the restoration gain at the high frequency side of the image.

Figure 2:
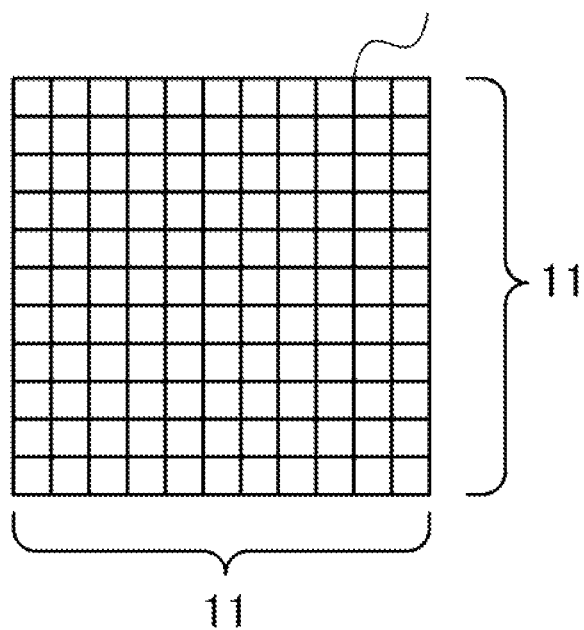
FIG. 2 is a diagram of describing an image restoration filter in the present embodiment.
Figure 3:
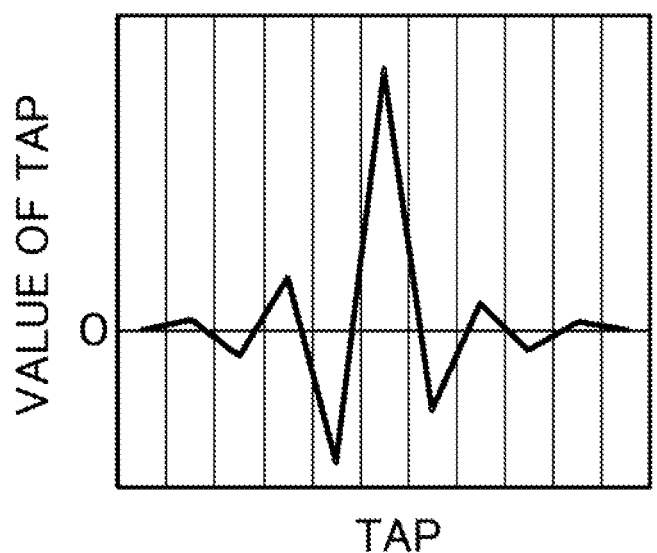
FIG. 3 is a diagram of describing the image restoration filter in the present embodiment.

Subsequently, referring to FIGS. 2 and 3, the image restoration filter will be described. In the image restoration filter, the tap number is determined in accordance with the aberration characteristics of the image pickup optical system or the required restoration accuracy. The image restoration filter in FIG. 2 is a two-dimensional filter having 11×11 taps as one example. In FIG. 2, a value (a coefficient) in each tap is omitted, and one cross section of this image restoration filter is illustrated in FIG. 3. A distribution of the value (the coefficient value) of each tap of the image restoration filter has a function that restores a signal value (PSF) that is spatially spread by the aberration to one original point ideally.

The convolution processing (the product sum) is performed for each tap of the image restoration filter in a step of the image restoration processing with respect to each pixel of the image. In the convolution processing, in order to improve a signal value of a predetermined pixel, the pixel matches a center of the image restoration filter. Then, a product of the signal value of the image and the coefficient value of the filter is obtained for each image and each corresponding pixel of the image restoration filter, and the total sum is replaced as a signal value of the center pixel.

Subsequently, referring to FIGS. 4A, 4B, 5A, and 5B, characteristics in a real space and a frequency space of the image restoration will be described. FIGS. 4A and 4B are diagrams of describing the point spread function PSF, and FIG. 4A illustrates the point spread function PSF before the image restoration is performed and FIG. 4B illustrates the point spread function PSF after the image restoration is performed. FIGS. 5A and 5B are diagrams of describing an amplitude component MTF and a phase component PTF of the optical transfer function OTF. A dashed line (1) in FIG. 5A illustrates the MTF before the image restoration is performed, and a dashed-dotted line (2) illustrates the MTF after the image restoration is performed. A dashed line (1) in FIG. 5B illustrates the PTF before the image restoration is performed, and a dashed-dotted line (2) illustrates the PTF after the image restoration is performed. As illustrated in FIG. 4A, the point spread function PSF before the image restoration has an asymmetric spread, and the phase component PTF has a non-linear value with respect to the frequency due to this asymmetry. Since the image restoration processing amplifies the amplitude component MTF and performs a correction so that the phase component PTF becomes zero, the point spread function PSF after the image restoration has a symmetric and sharp-pointed shape.

Thus, the image restoration filter can be obtained by the inverse Fourier transform for the function that is designed based on the inverse function of the optical transfer function OTF of the image pickup optical system. The image restoration filter that is used in the present embodiment can be changed if necessary, and for example the Wiener filter as described above can be used. When the Wiener filter is used, the image restoration filter in a real space where an image is really convoluted can be generated by performing the inverse Fourier transform for Expression (6). The optical transfer function OTF changes in accordance with an image height of the image pickup optical system (a position of the image) even in one image pickup state. Therefore, the image restoration filter is used by changing in accordance with the image height.

[Embodiment 1]

Next, referring to FIG. 1, an image processing method in Embodiment 1 of the present invention will be described. FIG. 1 is a flowchart of the image processing method (an image processing program) in the present embodiment. The flowchart of FIG. 1 is performed based on an instruction of an image processing apparatus described below.

First of all, in Step S11, an image (a taken image) is obtained as an input image. The image can be obtained by connecting an image pickup apparatus with an image processing apparatus by wired or wireless connections. The image can also be obtained via a storage medium. Subsequently, in Step S12, an image pickup condition is obtained. The image pickup condition includes a focal length, an aperture (an F-number), an object distance, or the like. When the image pickup apparatus is configured so that a lens is interchangeably mounted on a camera, the image pickup condition further includes a lens ID or a camera ID. Information related to the image pickup condition can be directly obtained from the image pickup apparatus. Alternatively, this information can also be obtained from information added to an image.

Next, in Step S13, coefficient data that are suitable for the image pickup condition is obtained. The coefficient data are data to reconstruct the optical transfer function OTF, and for example desired coefficient data are selected from a plurality of coefficient data that are previously stored in accordance with the image pickup condition. When the image pickup condition such as the aperture, the object distance, or the focal length of the zoom lens is a specific condition, the coefficient data corresponding to the image pickup condition can also be generated by an interpolation processing from the coefficient data of other image pickup conditions that are previously stored. In this case, an amount of data of the image restoration filter to be stored can be reduced. As an interpolation processing, for example a bilinear interpolation (a linear interpolation), a bicubic interpolation or the like is used, but the present embodiment is not limited to this. Subsequently, in Step 14, the optical transfer function OTF is reconstructed based on the coefficient data. In other words, using the coefficient data depending on the image pickup condition of the image, a plurality of first optical transfer functions depending on a position of the image are generated. The generation of the first optical transfer functions is performed by a first optical transfer function generating portion. The image pickup optical system may include an image pickup element or an optical low-pass filter. The details of the reconstruction of the optical transfer function OTF will be described below.

Next, in Step S15, the reconstructed optical transfer function OTF is rotated around a screen center (a center of the image) or an optical axis of the image pickup optical system to expand the optical transfer function OTF (a second optical transfer function generating portion). Specifically, the optical transfer function OTF is interpolated in accordance with the pixel arrangement to discretely arrange the optical transfer function OTF at a plurality of positions in the image. Next, in Step S16, the optical transfer function OTF is converted into the image restoration filter, i.e. the image restoration filter is generated by using the expanded optical transfer function OTF (An image restoration filter generating portion). The image restoration filter is generated by making restoration filter characteristics in a frequency space based on the optical transfer function OTF and performing the inverse Fourier transform to be converted to a filter in a real space (the image restoration filter).

Referring to FIGS. 6A to 6E, Steps S15 and S16 will be described in detail. FIGS. 6A to 6E are diagrams of illustrating a method of generating the image restoration filter. As illustrated in FIG. 6A, the reconstructed optical transfer function OTF is arranged on a circumscribed circle region of the image (the image pickup region) at the screen center (the center of the image) or in one direction (a vertical direction) that passes through the optical axis of the image pickup optical system.

In the present embodiment, in Step S14, as illustrated in FIG. 6A, the optical transfer function is expanded on a straight line, but the embodiment is not limited to this. For example, in an image plane, straight lines that pass through a center of the image and that are orthogonal to each other are defined as a first straight line (y in FIG. 6A) and a second straight line (x in FIG. 6A). In this case, at least two optical transfer functions of the optical transfer functions generated in Step S14 only have to be an optical transfer function that corresponds to a position (an image height) on the first straight line. In other words, as long as the reconstructed optical transfer functions OTF are arranged at a plurality of positions (a plurality of positions in the image) that are arrayed at distances different from each other from the screen center or the optical axis of the image pickup optical system in a predetermined direction, they do not need to be linearly arrayed in one direction. When a pixel that includes the center of the image does not exist, i.e. the center of the image exists between pixels, the optical transfer function generated in Step S14 only has to be an optical transfer function that corresponds to a position (an image height) of one of pixels that hold the first straight line from both sides.

When the optical transfer functions OTF are arrayed in one direction, the direction is not limited to the vertical direction and other directions such as a horizontal direction may also be adopted. When the optical transfer functions OTF are linearly arrayed in one of the vertical direction and the horizontal direction, the image processing of the present embodiment is more easily performed and therefore it is more preferable.

Subsequently, the reconstructed optical transfer function OTF is rotated and the interpolation processing (various kinds of processings depending on a pixel arrangement after the rotation) is performed if necessary, and as a result the optical transfer function OTF is rearranged as illustrated in FIG. 6B. The interpolation processing includes an interpolation processing in a radial direction and an interpolation processing due to the rotation, and the optical transfer function OTF can be rearranged at an arbitrary position. Next, with respect to the optical transfer function OTF at each position, for example the frequency characteristics of the image restoration filter is calculated as represented in Expression (6) to perform the inverse Fourier transform, and thus the conversion to the image restoration filter in a real space is performed as illustrated in FIG. 6C.

The image pickup optical system of the present embodiment is a rotationally symmetric optical system. Therefore, using its symmetry, the optical transfer function OTF can be inversed as illustrated in FIG. 6D to be expanded to an entire region of the screen (an entire of a defined region of the optical transfer function). In other words, in the image, straight lines that pass through a center of the image and that are orthogonal to each other are defined as a first straight line (y in FIG. 6A) and a second straight line (x in FIG. 6A). Furthermore, a region that is symmetric to a first region (63 in FIG. 6C) of the image with respect to the center of the image or the optical axis of the image pickup optical system is defined as a second region (61 in FIG. 6C), and a region that is symmetric to the first region with respect to the first straight line is defined as a third region (62 in FIG. 6C). In this case, using the optical transfer function for the first region, the optical transfer functions for the second region and the third region are generated. As a result, the Fourier transform processing is reduced to around ¼ of positions that are to be finally rearranged. If the optical transfer function of FIG. 6B and the image restoration filter of FIG. 6C are rearranged by the rotation and the interpolation processing as illustrated in FIG. 6E to be expanded as illustrated in FIG. 6D using the symmetry, the Fourier transform processing can be further reduced. The arrangement (the arrangement density of the restoration filter) illustrated in FIGS. 6A to 6E is one example, and the arrangement interval can be arbitrarily set in accordance with the variation of the optical transfer function OTF of the image pickup optical system.

Next, in Step S17 of FIG. 1, the image restoration processing is performed for the image using the image restoration filter generated in Step S16 (the image restoration portion). In other words, the image restoration processing is performed for the image by convoluting the image restoration filter to the image. Then, in Step S18, a restored image is obtained based on the result of the image restoration processing in Step S17.

In performing the convolution of the image restoration filter, pixels other than that at a position where the image restoration filter of FIG. 6D is arranged can also be generated by the interpolation using a plurality of filters arranged nearby. In this case, the image restoration filter includes a first image restoration filter at a first position of the image and a second image restoration filter at a second position of the image. The first image restoration filter is generated by using the expanded optical transfer function. The second image restoration filter is generated by the interpolation using the first image restoration filter. Performing such an interpolation processing, for example the image restoration filter can be changed for each one pixel.

Figure 7:
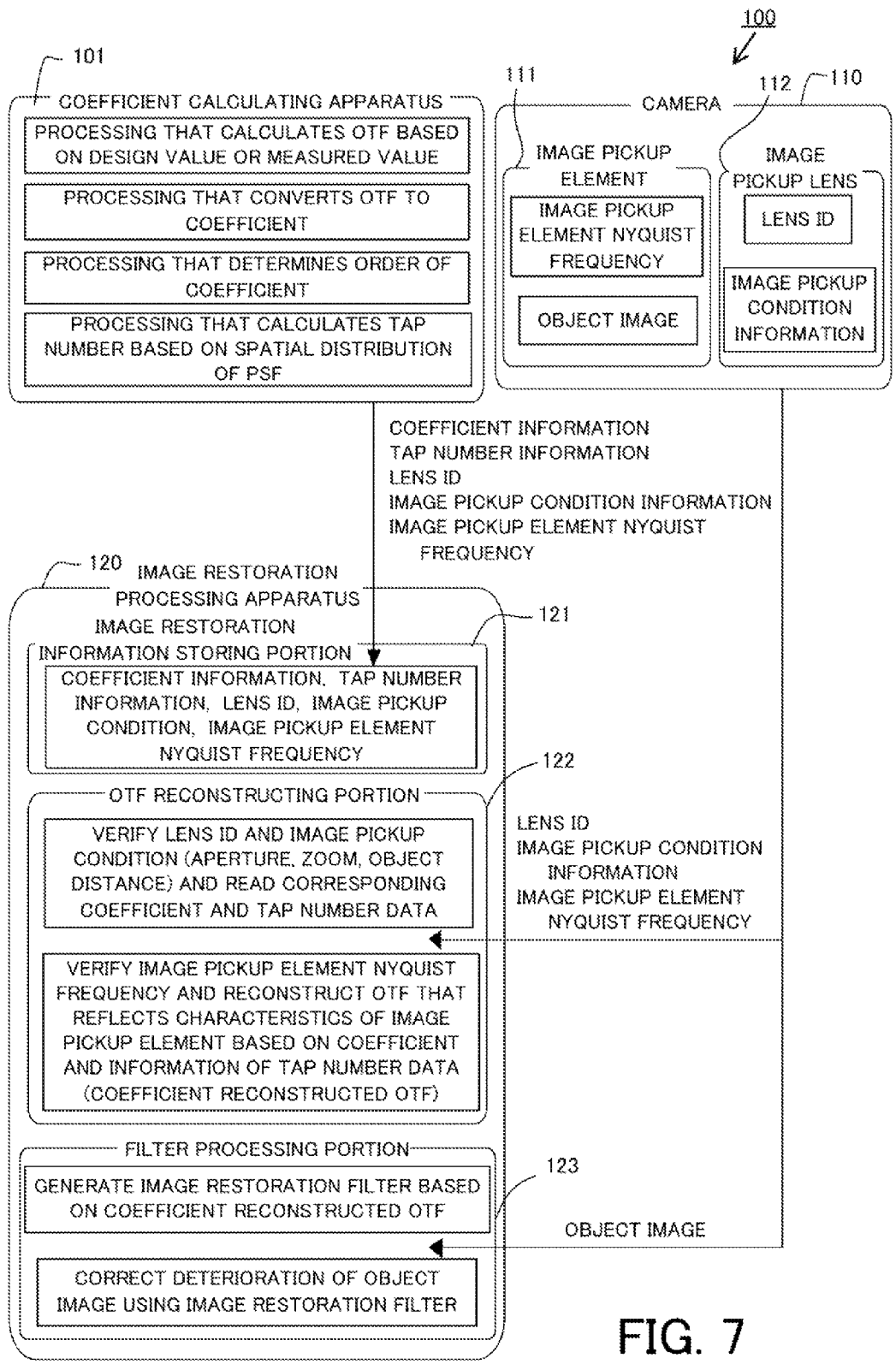
FIG. 7 is a diagram of describing an image processing system in Embodiment 1.

Next, referring to FIG. 7, an image processing system that includes an image processing apparatus that performs the image processing method described above will be described. FIG. 7 is a diagram of describing an image processing system 100 in the present embodiment. The image processing system 100 is configured by including a coefficient calculating apparatus 101, a camera 110 (an image pickup apparatus), and an image restoration processing apparatus 120 (an image processing apparatus).

The coefficient calculating apparatus 101 calculates coefficient data to reconstruct the optical transfer function OTF in accordance with the image pickup condition of the image. The coefficient calculating apparatus 101 performs a processing that calculates the optical transfer function OTF based on a design value or a measured value of the image pickup optical system. The coefficient calculating apparatus 101 coverts the optical transfer function OTF to a coefficient, and determines an order of the coefficient that is to be used for the reconstruction of the optical transfer function OTF in accordance with required accuracy. The coefficient calculating apparatus 101 determines the tap number for each image height required in reproducing the optical transfer function OTF based on the size of the spatial distribution of the point spread function PSF. The coefficient calculating apparatus 101 calculates and outputs coefficient data up to the required order and information related to the tap number for various kinds of combinations of the image pickup lenses and the image pickup elements of the cameras. The camera 110 includes the image pickup element 111 and the image pickup lens 112. The camera 110 adds the lens ID of the image pickup lens 112 and the information related to the image pickup condition (aperture, zoom, object distance, or the like) and Nyquist frequency of the image pickup element 111 to the image taken by the image pickup lens 112 and outputs the image.

The image restoration processing apparatus 120 (the image processing apparatus) is configured by including an image restoration information storing portion 121, an OTF reconstructing portion 122, and a filer processing portion 123 (a generating portion). The image restoration processing apparatus 120 stores information outputted from the coefficient calculating apparatus 101 and the camera 110, and corrects a deteriorated image taken by the image pickup lens 112 using the information (performs the image restoration processing for the image).

The image restoration information storing portion 121 stores the information of the coefficient data, the tap number, the lens ID, the image pickup condition, and the Nyquist frequency of the image pickup element, for each of the various kinds of combinations of the image pickup lens 112 and the image pickup element 111 which is calculated by the coefficient calculating apparatus 101. Thus, the image restoration information storing portion 121 is a storage portion that stores the coefficient data depending on the image pickup condition of the image.

The OTF reconstructing portion 122 obtains the Nyquist frequency information of the image pickup element 111 and the image from the camera 110, and obtains the information related to the lens ID of the image pickup lens 112 and the image pickup condition. The OTF reconstructing portion 122 searches the coefficient data and the tap number that are stored in the image restoration information storing portion 121 based on the lens ID and the image pickup condition of the camera 110 that is used by a user in taking the image, and obtains the corresponding coefficient data and tap number. The OTF reconstructing portion 122 reconstructs the optical transfer function OTF that is used by the filter processing portion 123 in a spatial frequency region up to the Nyquist frequency of the image pickup element of the camera 110. In other words, using the obtained coefficient data and tap number, it reconstructs the optical transfer function OTF of the image pickup optical system (the image pickup lens 112) depending on the position of the image. Thus, the OTF reconstructing portion 122 is a reconstructing portion that reconstructs the optical transfer function OTF of the image pickup optical system depending on the position of the image using the coefficient data. The OTF reconstructing portion 122 is also an expanding portion that expands the optical transfer function OTF by rotating the optical transfer function OTF around the center of the image or around the optical axis of the image pickup optical system. Hereinafter, the optical transfer function OTF that is reconstructed by the OTF reconstructing portion 122 is referred to as a reconstructed OTF.

The filter processing portion 123 generates the image restoration filter that corrects the deteriorations of the image using the reconstructed OTF generated by the OTF reconstructing portion 122, and corrects the deterioration of the image. In other words, the filter processing portion 123 is a generating portion that generates the image restoration filter using the expanded optical transfer function OTF. The filter processing portion 123 is also a processing portion that performs the image restoration processing for the image using the image restoration filter. If the coefficient data or the tap number that is previously calculated by the coefficient calculating apparatus 101 is stored in the image restoration information storing portion 121, it is not necessary to provide the user (the photographer) with the coefficient calculating apparatus 101. The user can also use the information necessary for the image restoration processing such as coefficient data by downloading via a network or various kinds of storage media.

Next, a coefficient calculating method by the coefficient calculating apparatus 101 will be described in detail. In the present embodiment, the coefficient calculating apparatus 101 generates the coefficient data by fitting the design value or the measured value of the optical transfer function OTF of the image pickup optical system (the image pickup lens 112) with a predetermined function. In other words, the coefficient calculating apparatus 101 generates the coefficient data by performing the approximation by the fitting of the optical transfer function OTF of the image pickup optical system to the predetermined function. In the present embodiment, the fitting is performed by using Legendre polynomial. However, the present embodiment is not limited to this, and the fitting can also be performed by using other functions such as Chebushev polynomial. Legendre polynomial is represented by Expression (7).

$$P_n(x) = \frac{1}{2^n} \sum_{k=0}^{[\frac{n}{2}]} (-1)^k \frac{(2n-2k)!}{k!(n-k)!(n-2k)!} x^{n-2k} \quad (7)$$

In Expression (7), symbol [x] denotes the maximum integer of integers that do not exceed x.

Since OTF is represented in a form of z=f(x, y), a coefficient $a_{ij}$ of Expression (8) needs to be calculated.

$$z = \sum_{i}^{i=m} \sum_{j}^{j=n} a_{ij} P(x)_i P(y)_j \quad (8)$$

Expression (8) is an orthogonal function, and the value of $a_{ij}$ is determined independently of the order in the fitting. When the fitting of the optical transfer function OTF can be sufficiently performed with high accuracy using the characteristics of the orthogonal function of Expression (8) even in a case of a low order, an amount of information related to the coefficient data that is to be stored in the apparatus can be reduced.

Figure 8:
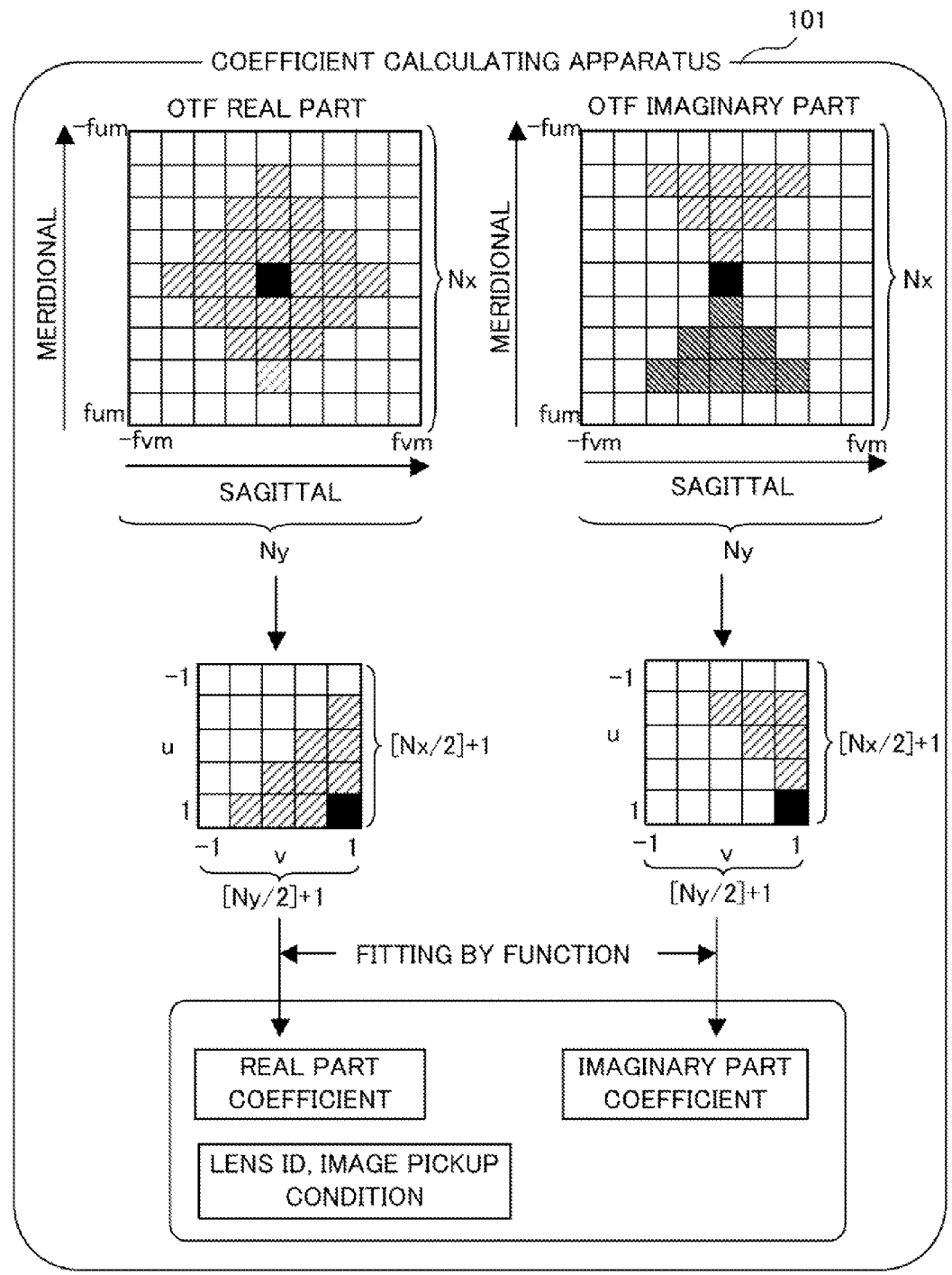
FIG. 8 is a diagram of describing a coefficient calculating apparatus in Embodiment 1.

Subsequently, referring to FIG. 8, the coefficient calculating apparatus 101 will be described in detail. FIG. 8 is a diagram of describing the coefficient calculating apparatus 101, which illustrates a specific method of fitting the optical transfer function OTF using Expressions (7) and (8). Symbols fum and fvm indicated in FIG. 8 denote Nyquist frequencies of the optical transfer function OTF in meridional and sagittal directions, respectively. Symbols Nx and Ny denote odd tap numbers of the optical transfer function OTF in the meridional and sagittal directions, respectively. The coefficient calculating apparatus 101 calculates the coefficient data by performing the fitting for each of a real part and an imaginary part of the optical transfer function OTF.

The real part of the optical transfer function OTF is symmetric between the meridional direction and the sagittal direction. The imaginary part of the optical transfer function OTF is symmetric although it has opposite signs of positive and negative signs in the meridional direction, and the imaginary part is symmetric in the sagittal direction. Using such symmetry, as data of the optical transfer function OTF for which the fitting is subject to be performed, the information of ¼ region (a part of the defined region) of an entire of the defined region is necessary and sufficient. In other words, the optical transfer function OTF can be expanded to the entire of the defined region using the symmetry with respect to the screen center or the optical axis of the image pickup optical system. For the reason above, in order to perform the fitting of the optical transfer function OTF with high accuracy in the present embodiment, the fitting is performed by cutting out the region of ¼ of the entire of the defined region with the real part and the imaginary part from the optical transfer function OTF so that a DC component is contained. In the present embodiment, a case in which the data of the optical transfer function OTF include Nx(row)×Ny(column) taps is described, and data of 1 to [Nx/2]+1 rows and 1 to [Ny/2]+1 columns are cut out from the data, but the present embodiment is not limited to this.

FIG. 9 is a diagram of describing the coefficient data that are calculated by the method described above. In FIG. 9, an example where the coefficients of the real part and the imaginary part of the optical transfer function OTF are calculated up to 10th order for both x and y for each image height is illustrated. The lens ID, the aperture, the zoom, and the object distance information are added to the coefficient group for each image height to complete one coefficient data (coefficient information). In the present embodiment, as one example, coefficient information for 10 image heights on the image pickup condition of lens ID: No123, aperture: F2.8, zoom: WIDE, and object distance: CLOSE are illustrated. The coefficient information for 10 image heights is used for reconstructing the optical transfer functions OTF at 10 areas in FIG. 6A. Furthermore, the coefficient data generated as described above may be functions between the image heights for each order. The coefficient calculating apparatus 101 generates the information for all the combinations of the lens ID, the aperture, the zoom, and the object distance information, and outputs the generated information to the image restoration processing apparatus 120.

Next, a method of determining the tap number of the reconstructed OTF will be described in detail. When the filter processing is performed for the image, the processing time heavily depends on the tap number of the filter. Therefore, it is preferred that the tap number of the filter be small if a desired effect of the image restoration is obtained and a harmful effect such as ringing is not generated during the filter processing.

The image restoration filter that is used by the filter processing portion 123 of the image restoration processing apparatus 120 is a filter in a real space. Accordingly, the tap number necessary for the filter in the real space may be determined. Since the image restoration filter is a filter that corrects the image deterioration by the point spread function PSF, a region that is equivalent to a region where the point spread function PSF is distributed on the real space may be ensured. In other words, the tap number necessary for the image restoration filter is the tap number in the region described above. Since the real space and the frequency space are in an inverse relation with each other, the tap number determined in the real space can be used in the frequency space.

Figure 10:
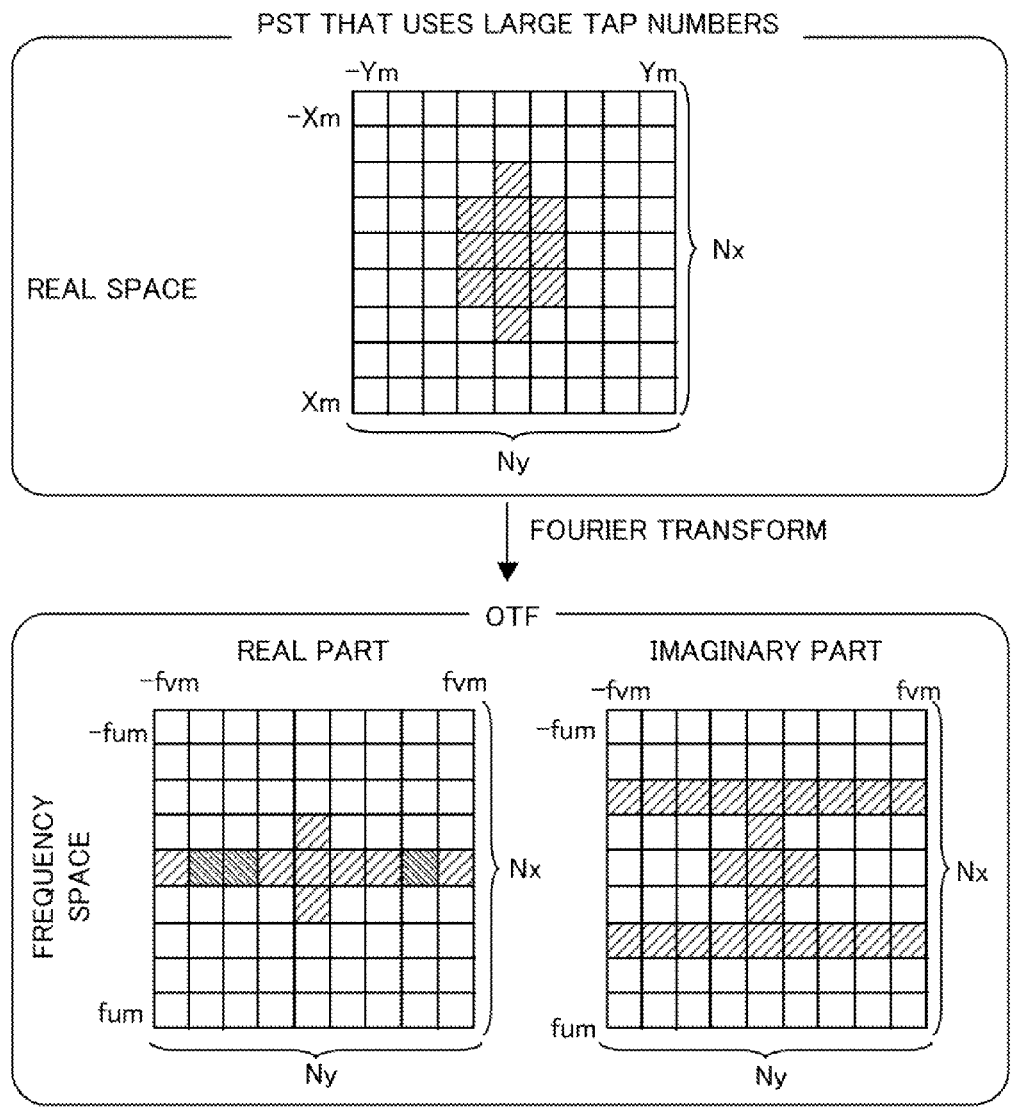
FIG. 10 is a diagram of tap numbers and frequency pitches in Embodiment 1.
Figure 11:
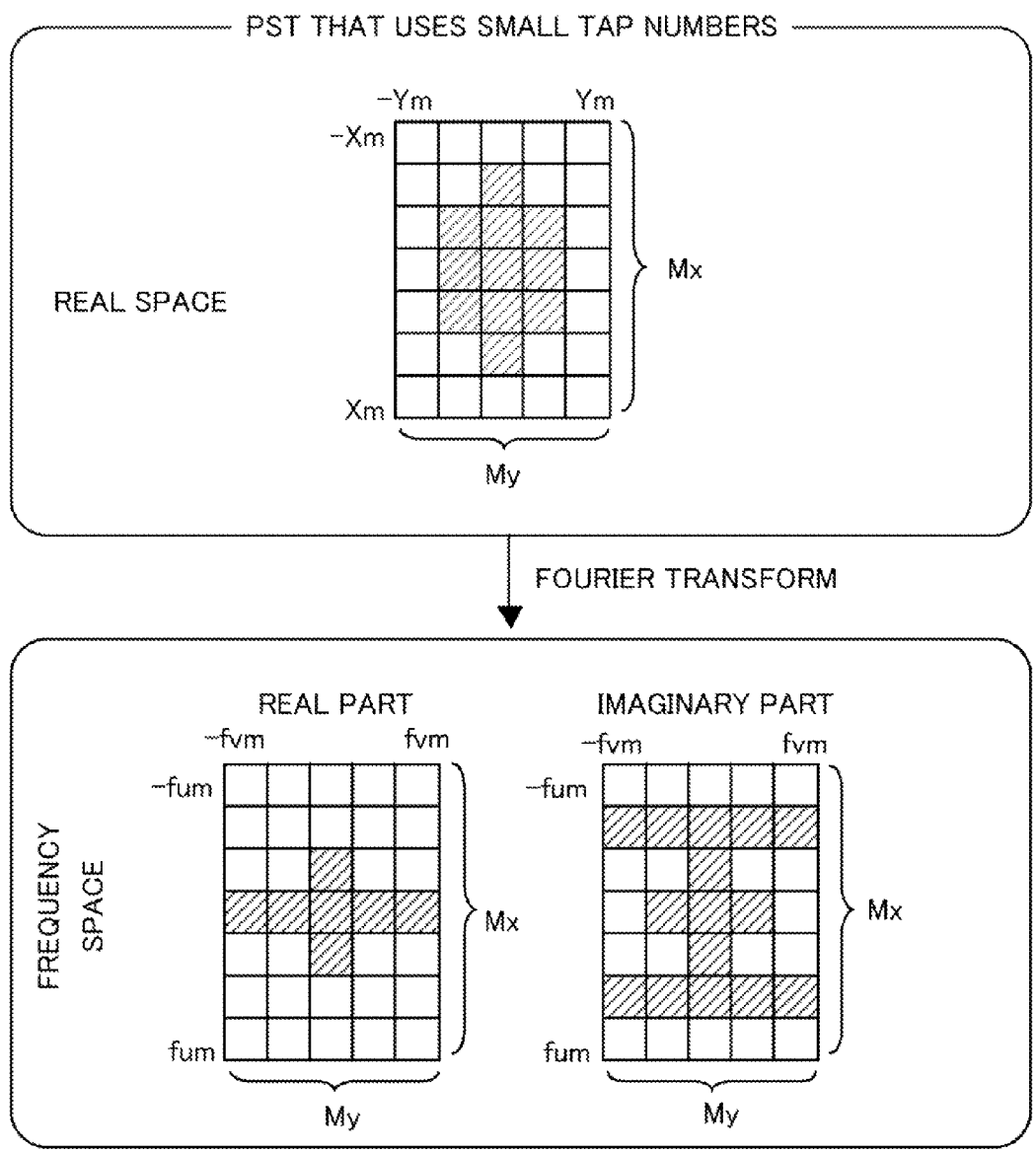
FIG. 11 is a diagram of the tap numbers and the frequency pitches in Embodiment 1.

FIGS. 10 and 11 are diagrams of describing the tap number and the frequency pitch. FIG. 10 illustrates a case in which the tap number is obtained in a sufficiently large region compared to the space distribution of the point spread function PSF. FIG. 11 illustrates a case in which the tap number is obtained in a region which is substantially equivalent to the space distribution of the point spread function. In FIG. 10, the tap number in the real space corresponds to the minimum frequency pitch in the frequency space. As illustrated in FIG. 11, reducing the tap number in the real space means that the frequency space is coarsely sampled, and it indicates that the minimum frequency pitch is enlarged. In this case, the value of the Nyquist frequency in the frequency space does not change.

The image restoration information storing portion 121 stores the coefficient information (the coefficient data), the tap number information, the lens ID, the image pickup condition, and the Nyquist frequency information of the image pickup element that are outputted from the coefficient calculating apparatus 101. The OTF reconstructing portion 122 obtains the lens ID and the image pickup condition in taking the image, and the Nyquist frequency information of the image pickup element from the camera 110. Then, the OTF reconstructing portion 122 reads the tap number information, the lens ID, the image pickup condition, and the Nyquist frequency information that correspond to each condition described above from the image restoration information storing portion 121, and generates the reconstructed OTF that is used for generating the image restoration filter using the information.

Figure 12:
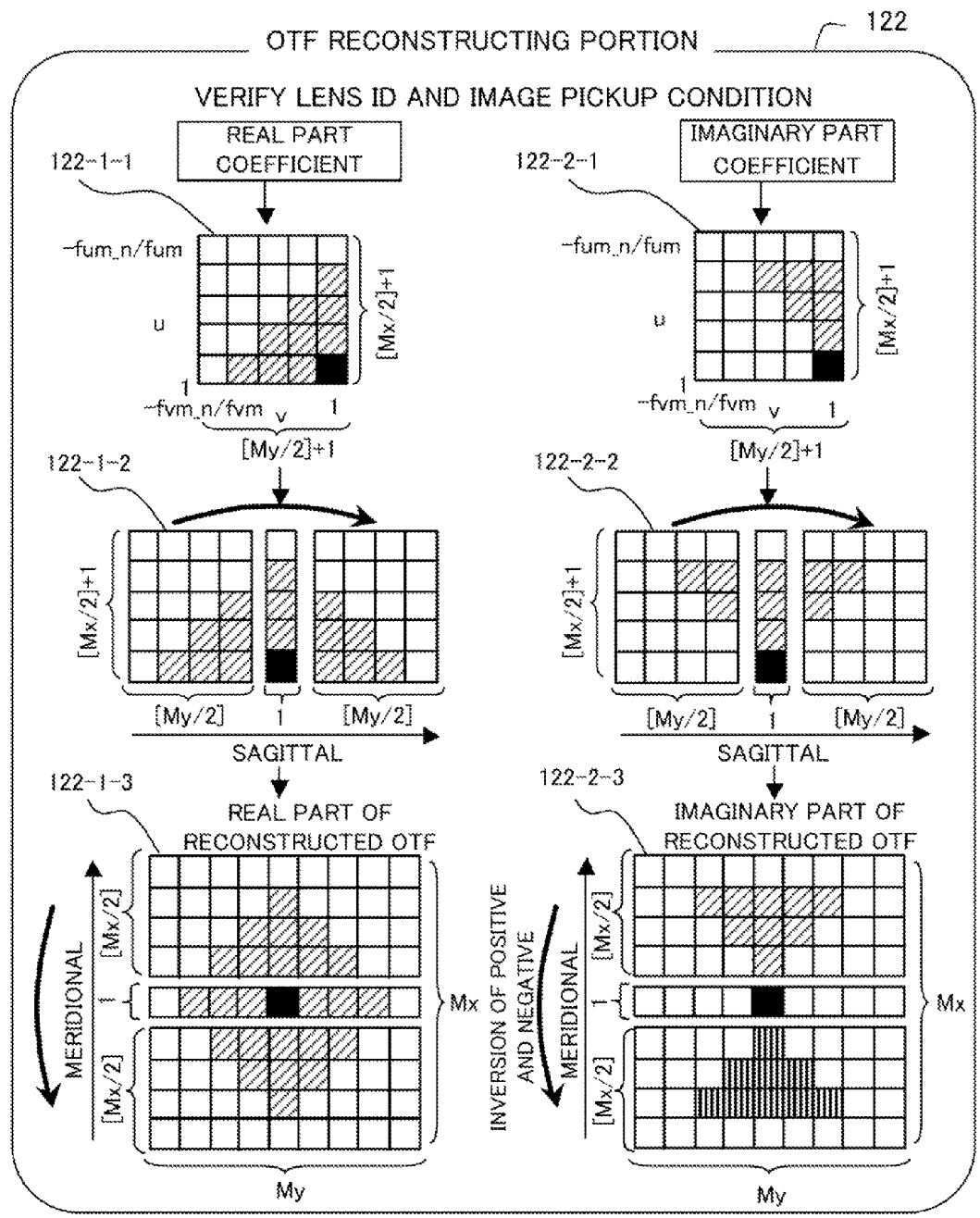
FIG. 12 is a diagram of describing an OTF reconstructing portion in Embodiment 1.

Next, referring to FIG. 12, a method of generating the reconstructed OTF will be described in detail. FIG. 12 is a diagram of illustrating the OTF reconstructing portion 122. In FIG. 12, the Nyquist frequencies in the meridional and sagittal directions that are necessary to generate the reconstructed OTF is denoted by fum_n and fvm_n respectively, and the tap numbers in the meridional and sagittal directions are denoted by Mx and My respectively. In the embodiment, $0 < \text{fum\_n} \leq \text{fum}$, $0 < \text{fvm\_n} \leq \text{fvm}$, $0 < Mx \leq Nx$, and $0 < My \leq Ny$ are met for fum and fvm, and Mx and My are odd numbers.

In the embodiment, x and y in Expressions (7) and (8) are replaced with u and m, respectively, and the defined region of $-\text{fum\_n/fum} \leq u \leq 1$ and $-\text{fvm\_n/fvm} \leq v \leq 1$ is sampled by [Mx/2]+1 and [My/2]+1 taps. Then, when the coefficient described above is substituted into Expression (8), the region of ¼ of the reconstructed OTF is generated. The procedure described above is performed for both the real part 122-1-1 and the imaginary part 122-2-1.

Next, based on the reconstructed OTF in the ¼ region of the real part and the imaginary part that are generated by the above method, the reconstructed OTF where a defined region is $-\text{fum\_n/fum} \leq u \leq \text{fum\_n/fum}$ and $-\text{fvm\_n/fvm} \leq v \leq \text{fvm\_n/fvm}$ and the tap number is Mx and My is generated.

First of all, a method of generating the real part of the reconstructed OTF will be described. The real part of the reconstructed OTF is separated into a region of 1 to [Mx/2]+1 rows and 1 to [My/2] columns and a region of 1 to [Mx/2]+1 rows and [My/2]+1 columns using the real part 122-1-1 of the reconstructed OTF. Next, as a real part 122-1-2, numerical data of the region of 1 to [Mx/2]+1 rows and 1 to [My/2] columns are substituted into the region of 1 to [Mx/2]+1 rows and [My/2]+2 to My columns so as to be symmetric with respect to a line of the region of 1 to [Mx/2]+1 rows and [My/2]+1 column.

Furthermore, as a real part 122-1-3, the reconstructed OTF of the ½ region generated in the real part 122-1-2 is separated into a region of 1 to [Mx/2] rows and 1 to My columns and a region of [Mx/2]+1 row and 1 to My columns. Then, numerical data of the region of 1 to [Mx/2] rows and 1 to My columns are substituted into the region of [Mx/2]+2 row and 1 to My columns so as to be symmetric with respect a line of the region of [Mx/2]+1 row and 1 to My columns. The imaginary part of the reconstructed OTF can be generated by a method similar to that for the real part, but in an imaginary part 122-2-3, the substitution needs to be performed so that positive and negative signs are replaced with each other. The characteristics of the optical transfer function OTF allows the generating method as described above.

Figure 13:
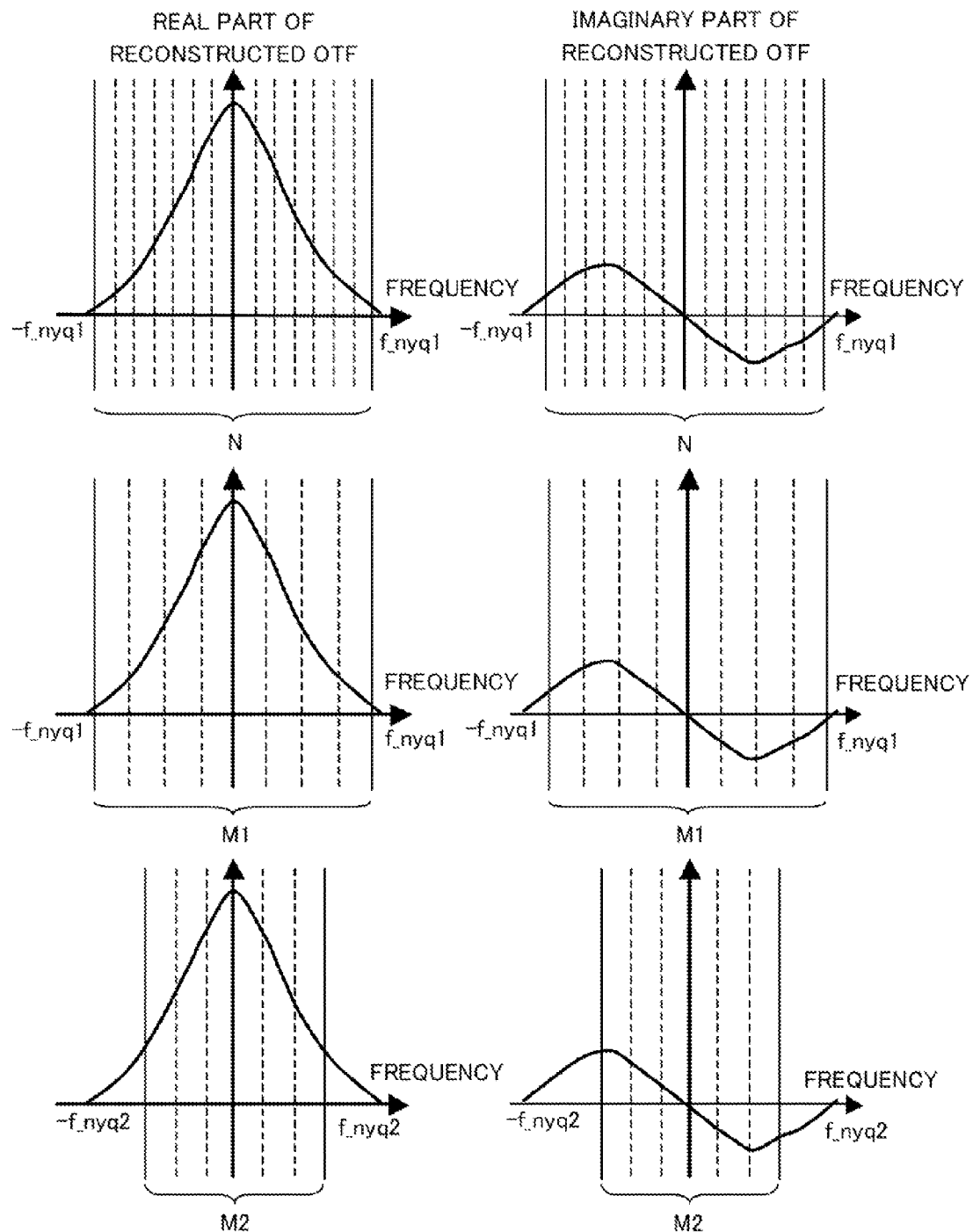
FIG. 13 is a diagram of describing the reconstructed OTF in Embodiment 1.

FIG. 13 is a diagram of a relationship between the Nyquist frequency of the reconstructed OTF and the tap number (the reconstructed OTF). As described above, the Nyquist frequency is a parameter that is determined based on the spatial resolution of the image pickup element 111, and the tap number is a parameter that depends on the point spread function PSF of the image pickup lens 112. A desired reconstructed OTF is generated using these two parameters and the coefficient data described above. In FIG. 13, the Nyquist frequency meets f_nyq1>f_nyq2 and the tap number meets N>M1>M2, and as illustrated in FIG. 13, the Nyquist frequency and the tap number can be controlled so as to be desired values.

As described above, since the optical transfer function OTF depending on the combination of the image pickup element and the lens and the image pickup condition is obtained as coefficient data to be stored in the image restoration processing apparatus 120, the image restoration processing depending on the image pickup condition during taking the image can be performed. In addition, as illustrated in FIGS. 6A to 6E, since the data of the entire image can be restored by the appropriate tap number from a small amount of coefficient data, an amount of stored data can be reduced.

Figure 14:
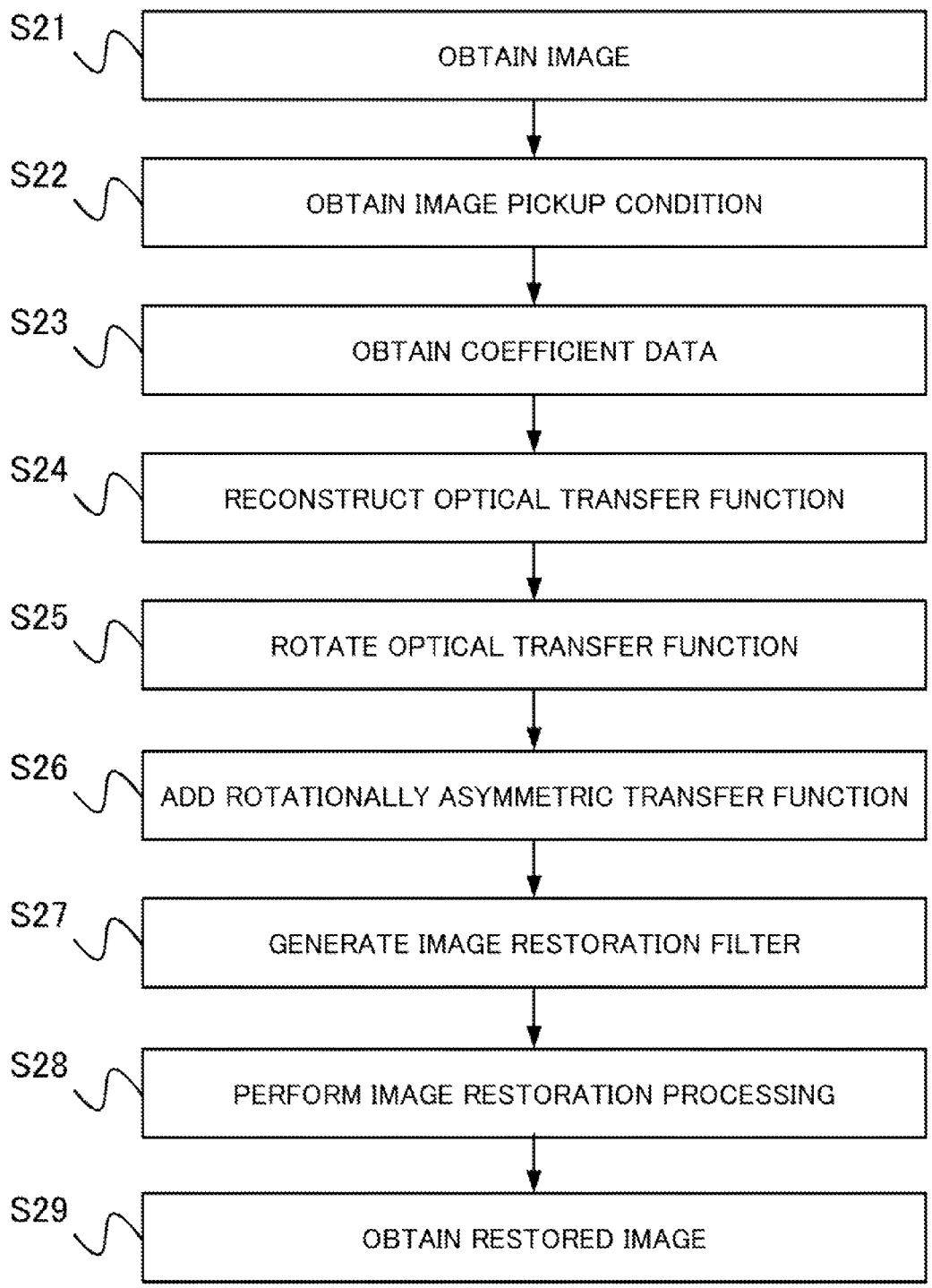
FIG. 14 is a flowchart of another image processing method in Embodiment 1.

Next, referring to FIG. 14, another image processing method (a modified example) in the present embodiment will be described. FIG. 14 is a flowchart of the other image processing method in the present embodiment. The image processing method of FIG. 14 is different from the image processing method of FIG. 1 in that a step of applying a transfer function that is rotationally asymmetric with respect to the screen center or the optical axis to the expanded optical transfer function OTF is added. Steps S21 to S25 and Steps S27 to S29 in FIG. 14 are the same as Steps S11 to S18 in FIG. 1, and therefore these descriptions will be omitted.

Passing through Steps S21 to S25 in FIG. 14, for example as illustrated in FIG. 6B, the optical transfer function OTF is rearranged. For example, when a rotationally asymmetric transfer function such as a transfer function of an optical low-pass filter or a transfer function of a pixel opening shape of the image pickup element 111 is considered, the rotationally asymmetric transfer function is applied (added) to each optical transfer function OTF in the state of FIG. 6B. In FIG. 6B, the optical transfer function OTF is expanded to the region of ¼ of the image, but in accordance with the symmetry of the transfer function, for example the optical transfer function OTF may also be applied after being expanded to the entire image region. As illustrated in FIG. 14, in the present embodiment, the image restoration filter can also be generated using the optical transfer function OTF to which the rotationally asymmetric transfer function has been applied.

[Embodiment 2]

Figure 15:
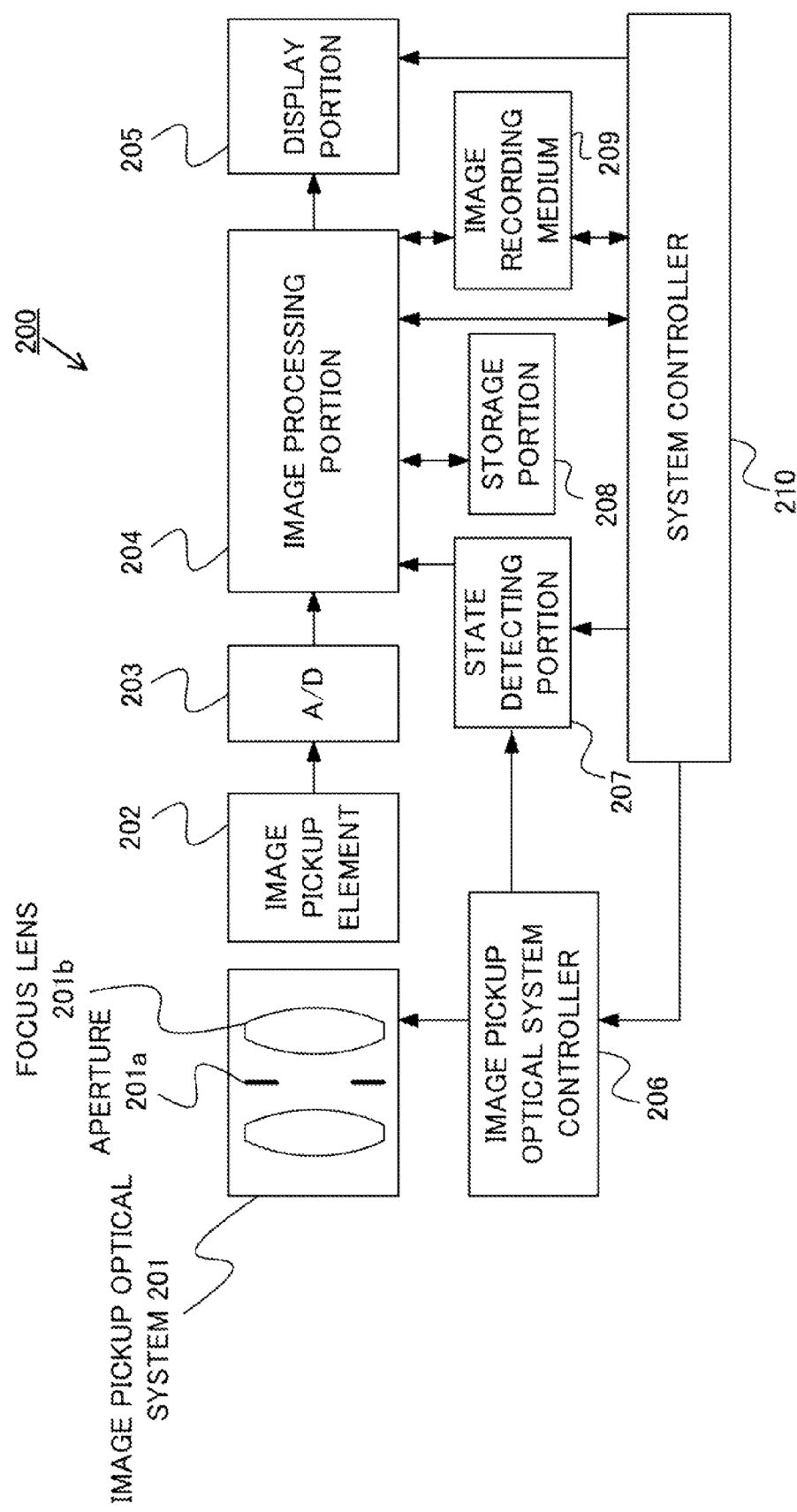
FIG. 15 is a configuration diagram of an image pickup apparatus in Embodiment 2.

Next, referring to FIG. 15, an image pickup apparatus in Embodiment 2 of the present invention will be described. FIG. 15 is a configuration diagram of an image pickup apparatus 200 in the present embodiment. An image processing program that performs an image restoration processing of an image (an image processing method that is similar to that of Embodiment 1) is installed in the image pickup apparatus 200, and this image restoration processing is performed by an image processing portion 204 (an image processing apparatus) in the image pickup apparatus 200.

The image pickup apparatus 200 is configured by including an image pickup optical system 201 (a lens) and an image pickup apparatus body (a camera body). The image pickup optical system 201 includes an aperture 201a and a focus lens 201b, which is configured integrally with the image pickup apparatus body (the camera body). However, the present embodiment is not limited to this, and can also be applied to an image pickup apparatus where the image pickup optical system 201 is interchangeably mounted on the image pickup apparatus body.

The image pickup element 202 performs a photoelectric conversion of an object image (imaged light) obtained via the image pickup optical system 201 to generate an image. In other words, the image pickup element 202 performs the photoelectric conversion for the object image to be converted to an analog signal (an electric signal). Then, this analog signal is converted to a digital signal by an A/D converter 203, and this digital signal is inputted to an image processing portion 204.

The image processing portion 204 (the image processing apparatus) performs a predetermined processing for this digital signal and also performs the image restoration processing described above. First of all, the image processing portion 204 obtains image pickup condition information of the image pickup apparatus from a state detecting portion 207. The image pickup condition information means information related to the aperture, an object distance, a focal length of a zoom lens, or the like. The state detecting portion 207 can directly obtain the image pickup condition information from a system controller 210, but the present embodiment is not limited to this. For example, the image pickup condition information related to the image pickup optical system 201 can also be obtained from an image pickup optical system controller 206. A processing flow of the image restoration processing (an image processing method) of the present embodiment is the same as that of Embodiment 1 described with reference to FIG. 1 or FIG. 14, and therefore descriptions thereof will be omitted.

The coefficient data to generate the reconstructed OTF is stored in a storage portion 208. An output image processed by the image processing portion 204 is stored in a predetermined format in an image recording medium 209. An image obtained by performing a predetermined processing for the display for the image where the image restoration processing of the present embodiment has been performed is displayed on a display portion 205. However, the embodiment is not limited to this, and in order to display the image at high speed, an easily processed image may also be displayed on the display portion 205.

Series of the controls in the present embodiment are performed by the system controller 210, and a mechanical drive of the image pickup optical system 201 is performed by the image pickup optical system controller 206 based on an instruction of the system controller 210. The image pickup optical system controller 206 controls a diameter of the aperture 201a as an image pickup condition setting for an F-number. Furthermore, since the image pickup optical system controller 206 performs a focusing operation in accordance with an object distance, it controls a position of the focus lens 201b using an autofocus (AF) mechanism or a manual focus (MF) mechanism (not shown). The function such as a diameter control of the aperture 201a or the manual focus does not need to be performed in accordance with the specification of the image pickup apparatus 200.

An optical element such as a low-pass filter or an infrared cut filter may also be inserted into the image pickup optical system 201, but there is a case in which the consideration is necessary at the time of generating the image restoration filter when an element such as a low-pass filter which influences on characteristics of the optical transfer function (OTF) is used. Furthermore, with regard to the infrared cut filter, there is a case where the consideration is necessary at the time of generating the image restoration filter since it influences on each PSF of RGB channels that is a value of integral of the point spread function (PSF) of a spectroscopic wavelength, particularly the PSF of the R channel. In this case, as described with reference to FIG. 14, the optical transfer function (OTF) is rearranged and then the rotationally asymmetric transfer function is added.

In the present embodiment, the coefficient data stored in the storage portion of the image pickup apparatus is used, but as a modified example, for example the image pickup apparatus may also be configured so as to obtain the coefficient data stored in a storage medium such as a memory card.

[Embodiment 3]

Figure 16:
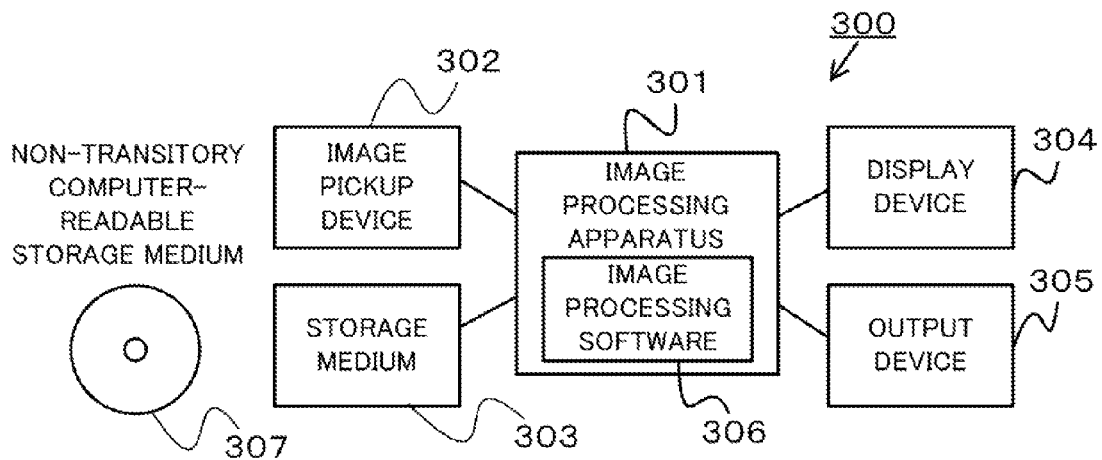
FIG. 16 is a configuration diagram of an image processing system in Embodiment 3.

Next, referring to FIG. 16, an image processing apparatus and an image processing system in Embodiment 3 of the present invention will be described. FIG. 16 is a configuration diagram of an image processing system 300 in the present embodiment. A processing flow of an image restoration processing (an image processing method) of the present embodiment is the same as that of Embodiment 1 described with reference to FIG. 1 or FIG. 14, and therefore descriptions thereof will be omitted.

In FIG. 16, an image processing apparatus 301 is a computer device in which image processing software 306 that instructs a computer (an information processing apparatus) to execute the image processing method of the present embodiment is installed. An image pickup device 302 is an image pickup apparatus such as a camera, a microscope, an endoscope, or a scanner. A storage medium 303 is a storage portion such as a semiconductor memory, a hard disk, or a server on a network that stores an image.

The present embodiment can also be achieved by performing the following processing. In other words, it is a processing in which software (a program) that achieves the function of the embodiments described above is provided to the system or the apparatus via a network or each of various kinds of storage media 307 (non-transitory computer-readable storage media) such as a CD-ROM so that a computer (CPU, MPU, or the like) of the system or the apparatus can read the program to be executed.

The image processing apparatus 301 obtains image data from the image pickup device 302 or the storage medium 303, and outputs image data for which a predetermined image processing has been performed to one or a plurality of an output device 305, the image pickup device 302, or the storage medium 303. The output can also be stored in a storage portion equipped in the image processing apparatus 301. The output device 305 is for example a printer.

A display device 304 that is a monitor is coupled to the image processing apparatus 301. Therefore, a user performs an image processing work via the display device 304, and can also estimate a corrected image. The image processing software 306 performs the image restoration processing (the image processing method) of the present embodiment and also performs a development or other image processings if necessary.

Figure 17:
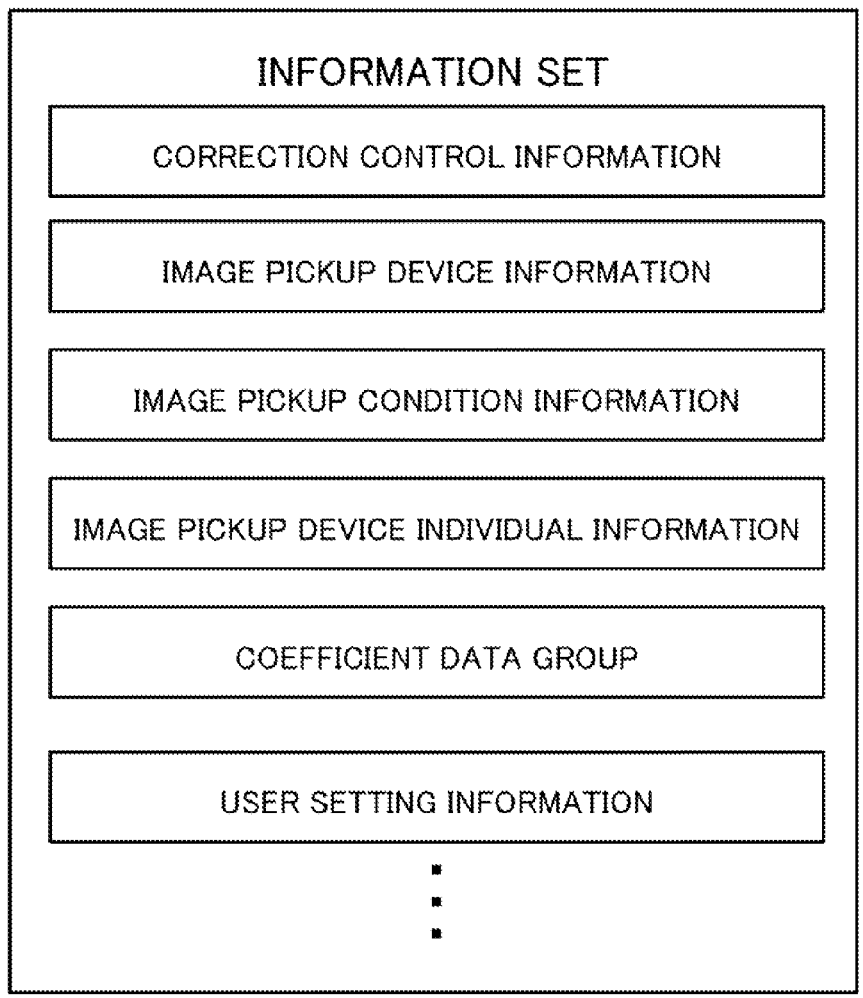
FIG. 17 is a diagram of describing a set of information in Embodiment 3.

Subsequently, referring to FIG. 17, contents of the data to perform the image processing method of the present embodiment and the transfer of the data between the devices will be described. FIG. 17 is a diagram of describing the information set (contents of the data). In the present embodiment, the information set contains the following information.

[Correction Control Information]

Correction control information is configured by setting information related to which device of the image processing apparatus 301, the image pickup device 302, or the output device 305 performs the correction processing, and selecting information of data that are to be transmitted to other devices in accordance with this correction processing. For example, when the restoration image is generated in the image pickup device 302, the coefficient data do not need to be transmitted. On the other hand, when the restoration image is generated by the image processing apparatus 301 while an uncorrected image is obtained from the image pickup device 302, the coefficient data, the tap number information, the lens ID, Nyquist information of the image pickup element, the image pickup condition, and the like are transmitted. Alternatively, it may also be configured so as to be selected from the coefficient data previously stored in the image processing apparatus 301 based on the image pickup device information or the image pickup condition information of the image pickup device 302 used for taking an image, and to be corrected to be used if necessary.

[Image Pickup Device Information]

Image pickup device information is identification information of the image pickup device 302.

When a lens is interchangeably mounted on a camera body, the image pickup device information contains the combination of the lens and the camera body. For example, the lens ID described above corresponds to this.

[Image Pickup Condition Information]

Image pickup condition information is information related to a state of the image pickup device 302 during taking the image. For example, it is a focal length, an aperture value, an object distance, ISO sensitivity, a white balance, or the like.

[Image Pickup Device Individual Information]

Image pickup individual information is identification information of an individual image pickup device for the image pickup device information described above. There is an individual difference in the optical transfer function (OTF) of the image pickup device 302 due to the difference of the manufacturing error. Therefore, the image pickup device individual information is effective information for setting an individually optimal correction parameter. The correction parameter is a correction coefficient such as coefficient data or an image restoration filter, a setting value such as a gain value for edge enhancement, a distortion correction, or a shading correction. When the state of the manufacturing error is previously recognized, initial data that are used for generating the image restoration filter are corrected to be able to perform a higher-accuracy image restoration processing.

[Coefficient Data Group]

Coefficient data group is a set of coefficient data that are used to correct phase deterioration. When a device that performs the image restoration processing does not have the coefficient data, the coefficient data need to be transmitted from another device.

[User Setting Information]

User setting information is a correction parameter to perform the correction so as to obtain the sharpness (degree of the restoration) depending on the preference of a user, or a correction value of the correction parameter. The user can variably set the correction parameter, but the user can always obtain his favorite output image if the user setting information is used. In addition, it is preferred that the user setting information be updated so as to be user's most favorite sharpness using a learning function based on a history of the correction parameter set by the user. Furthermore, a provider (a manufacturer) of the image pickup device 302 can provide a preset value depending on some sharpness patterns via a network or the storage medium 303.

It is preferred that the information set described above be added to individual image data. When the necessary correction information is added to the image data, the correction processing can be performed using a device that is provided with the image processing apparatus of the present embodiment. Furthermore, the content of the information set, if necessary, can be appropriately selected automatically or manually.

According to each of the above embodiments, since the optical transfer function is rearranged in an image and then it is converted to an image restoration filter in a real space, the image restoration filter depending on a position of the image is generated with high accuracy, compared to a case where the image restoration filter is rotated and corrected. Furthermore, since the image restoration filter can be generated with high accuracy, an amount of data related to the optical transfer function that needs to be previously stored can be reduced. Therefore, according to each embodiment, an image processing method capable of obtaining a restoration image corrected with high accuracy while reducing information amount that is used for the image restoration processing can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-172503, filed on Aug. 8, 2011, which is hereby incorporated by reference herein in its entirety.

What is claimed is:

1. An image processing method of performing an image restoration processing of an image, the image processing method comprising the steps of:
reconstructing optical transfer functions of an image pickup optical system depending on a position of the image using coefficient data depending on an image pickup condition of the image;
expanding the optical transfer functions by rotating the optical transfer functions around a center of the image or around an optical axis of the image pickup optical system;
generating image restoration filters using expanded optical transfer functions; and
performing the image restoration processing of the image using the image restoration filters.

2. The image processing method according to claim 1, wherein positions of the image are a plurality of positions that are arrayed at distances different from each other from the center of the image or the optical axis of the image pickup optical system in a predetermined direction.

3. The image processing method according to claim 2, wherein the predetermined direction is a horizontal direction or a vertical direction of the image.

4. The image processing method according to claim 1, wherein the image restoration filters include a first image restoration filter at a first position of the image and a second image restoration filter at a second position of the image,
wherein the first image restoration filter is generated by using the expanded optical transfer functions, and
wherein the second image restoration filter is generated by an interpolation using the first image restoration filter.

5. The image processing method according to claim 1, further comprising the step of
applying a transfer function that is rotationally asymmetric with respect to the center of the image or the optical axis of the image pickup optical system to the expanded optical transfer functions,
wherein the image restoration filters are generated by using optical transfer functions to which the rotationally asymmetric optical transfer function has been applied.

6. The image processing method according to claim 5, wherein the rotationally asymmetric transfer function is a transfer function of an optical low-pass filter.

7. The image processing method according to claim 5, wherein the rotationally asymmetric transfer function is a transfer function that has a pixel opening shape of an image pickup element.

8. The image processing method according to claim 1, wherein the coefficient data are coefficient data of a function obtained by approximating a design value or a measured value of the optical transfer functions of the image pickup optical system.

9. The image processing method according to claim 1,
wherein the optical transfer functions of the image pickup optical system contain a real part and an imaginary part and
wherein the coefficient data are coefficient data for each of the real part and the imaginary part.

10. The image processing method according to claim 9,
wherein the coefficient data are coefficient data of a part of a defined region of the optical transfer function and
wherein the optical transfer function is expanded to the entire of the defined region using the symmetry with respect to the center of the image or the optical axis of the image pickup optical system.

11. The image processing method according to claim 1, wherein the step of generating the image restoration filters includes a step of generating image restoration filters that are used to restore an image in one region of four regions on the image which are divided by two lines that pass the center of the image or the optical axis of the image pickup optical system and that are orthogonal to each other and a step of generating image restoration filters that are used to restore an image in another region by using the image restoration filters that are used to restore the image in one region.

12. The image processing method according to claim 11, wherein the image restoration filters in another region are generated by inversion of the image restoration filters in one region.

13. The image processing method according to claim 1, further comprising the step of generating optical transfer functions of at least one of a second region and a third region using optical transfer functions of a first region,
where the first region is one region of four regions on the image which are divided by two lines that pass the center of the image or the optical axis of the image pickup optical system and that are orthogonal to each other,
the second region is a region which is point-symmetric to the first region with respect to the center of the image or a point on the optical axis of the image pickup optical system and the third region is a region which is line-symmetric to the first region with respect to a straight line that passes through the center of the image or a point on the optical axis of the image pickup optical system.

14. The image processing method according to claim 1, further comprising the steps of:
generating image restoration filters in a first region using optical transfer functions of the first region, and
generating image restoration filters in at least one of a second region and a third region using the image restoration filters in the first region,
where the first region is one region of four regions on the image which are divided by two lines that pass the center of the image or the optical axis of the image pickup optical system and that are orthogonal to each other,
the second region is a region which is point-symmetric to the first region with respect to the center of the image or a point on the optical axis of the image pickup optical system and the third region is a region which is line-symmetric to the first region with respect to a straight line that passes through the center of the image or a point on the optical axis of the image pickup optical system.

15. An image processing apparatus that performs an image restoration processing of an image, the image processing apparatus comprising:
- a reconstructing portion configured to reconstruct optical transfer functions of an image pickup optical system depending on a position of the image using coefficient data depending on an image pickup condition of the image;
- an expanding portion configured to expand the optical transfer functions by rotating the optical transfer functions around a center of the image or around an optical axis of the image pickup optical system;
- a generating portion configured to generate image restoration filters using expanded optical transfer functions; and
- a processing portion configured to perform the image restoration processing of the image using the image restoration filters.

16. An image pickup apparatus that performs an image restoration processing of an image, the image pickup apparatus comprising:
- an image pickup optical system;
- an image pickup element configured to generate the image by photoelectrically converting an object image obtained via the image pickup optical system;
- a reconstructing portion configured to reconstruct optical transfer functions of the image pickup optical system depending on a position of the image using coefficient data depending on an image pickup condition of the image;
- an expanding portion configured to expand the optical transfer functions by rotating the optical transfer functions around a center of the image or around an optical axis of the image pickup optical system;
- a generating portion configured to generate image restoration filters using expanded optical transfer functions; and
- a processing portion configured to perform the image restoration processing of the image using the image restoration filters.

17. A non-transitory computer-readable storage medium storing a process for causing an information processing apparatus to execute a method, the method comprising the steps of:
- reconstructing optical transfer functions of an image pickup optical system depending on a position of the image using coefficient data depending on an image pickup condition of the image;
- expanding the optical transfer functions by rotating the optical transfer functions around a center of the image or around an optical axis of the image pickup optical system;
- generating image restoration filters using expanded optical transfer functions; and
- performing the image restoration processing of the image using the image restoration filters.

18. An image processing method that performs an image restoration processing of an image, the image processing method comprising the steps of:
- reconstructing first optical transfer functions of an image pickup optical system depending on a position of the image using coefficient data depending on an image pickup condition of the image;
- expanding the first optical transfer functions so as to generate second optical transfer functions that are equivalent to optical transfer functions obtained by rotating the first optical transfer functions around a center of the image or around an optical axis of the image pickup optical system;
- generating image restoration filters using the second optical transfer functions; and
- performing the image restoration processing of the image using the image restoration filters.

19. An image processing apparatus that performs an image restoration processing of an image, the image processing apparatus comprising:
- a reconstructing portion configured to reconstruct first optical transfer functions of an image pickup optical system depending on a position of the image using coefficient data depending on an image pickup condition of the image;
- an expanding portion configured to expand the first optical transfer functions so as to generate second optical transfer functions that are equivalent to optical transfer functions obtained by rotating the first optical transfer functions around a center of the image or around an optical axis of the image pickup optical system;
- a generating portion configured to generate image restoration filters using the second optical transfer functions; and
- a processing portion configured to perform the image restoration processing of the image using the image restoration filters.

20. An image pickup apparatus that performs an image restoration processing of an image, the image pickup apparatus comprising:
- an image pickup optical system;
- an image pickup element configured to generate the image by photoelectrically converting an object image obtained via the image pickup optical system;
- a reconstructing portion configured to reconstruct first optical transfer functions of the image pickup optical system depending on a position of the image using coefficient data depending on an image pickup condition of the image;
- an expanding portion configured to expand the first optical transfer functions so as to generate second optical transfer functions that are equivalent to optical transfer functions obtained by rotating the first optical transfer functions around a center of the image or around an optical axis of the image pickup optical system;
- a generating portion configured to generate image restoration filters using the second optical transfer functions; and
- a processing portion configured to perform the image restoration processing of the image using the image restoration filters.

21. A non-transitory computer-readable storage medium storing a process for causing an information processing apparatus to execute a method, the method comprising the steps of:
- reconstructing first optical transfer functions of an image pickup optical system depending on a position of the image using coefficient data depending on an image pickup condition of the image;
- expanding the first optical transfer functions so as to generate second optical transfer functions that are equivalent to optical transfer functions obtained by rotating the first optical transfer functions around a center of the image or around an optical axis of the image pickup optical system;
- generating image restoration filters using the second optical transfer functions; and
- performing the image restoration processing of the image using the image restoration filters.

* * * * *